US010826670B2

(12) United States Patent
Sun et al.

(10) Patent No.: US 10,826,670 B2
(45) Date of Patent: Nov. 3, 2020

(54) SIGNAL RESOURCE CONFIGURATION METHOD, TERMINAL, AND ACCESS NETWORK DEVICE

(71) Applicant: Huawei Technologies Co., Ltd., Shenzhen (CN)

(72) Inventors: Yanliang Sun, Shenzhen (CN); Bin Liu, San Diego, CA (US); Kai Xu, Shenzhen (CN); Xiaodong Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/340,627

(22) PCT Filed: Oct. 9, 2016

(86) PCT No.: PCT/CN2016/101607
§ 371 (c)(1),
(2) Date: Apr. 9, 2019

(87) PCT Pub. No.: WO2018/064842
PCT Pub. Date: Apr. 12, 2018

(65) Prior Publication Data
US 2019/0363859 A1    Nov. 28, 2019

(51) Int. Cl.
*H04L 5/00* (2006.01)
*H04L 1/00* (2006.01)
(Continued)

(52) U.S. Cl.
CPC .......... *H04L 5/0057* (2013.01); *H04L 1/0026* (2013.01); *H04L 5/0051* (2013.01); *H04W 24/10* (2013.01); *H04W 72/0473* (2013.01)

(58) Field of Classification Search
CPC ....... H04L 5/00; H04L 5/0057; H04L 1/0026; H04W 24/10; H04W 24/0473
See application file for complete search history.

(56) References Cited

U.S. PATENT DOCUMENTS

2014/0301338 A1*  10/2014  Zhong ................... H04L 5/0055
                                                370/329
2016/0050153 A1    2/2016  Xu et al.
2017/0222768 A1*  8/2017  Lee ..................... H04L 25/0204

FOREIGN PATENT DOCUMENTS

CN        105075319 A    11/2015
CN        105790904 A     7/2016
(Continued)

OTHER PUBLICATIONS

Ericsson, "Further discussion on CSI-RS pooling," 3GPP TSG RAN WG1 Meeting #87, R1-1612352; Reno, USA, Nov. 14-18, 2018, 6 pages.*
(Continued)

*Primary Examiner* — Afsar M Qureshi
(74) *Attorney, Agent, or Firm* — Conley Rose, P.C.

(57) ABSTRACT

A signal resource configuration method, a terminal, and an access network device to reduce impact on an existing standard and save Channel State Information Reference Signal (CSI-RS) resources. The method includes obtaining, by the access network device, a 2N-port CSI-RS resource sequence number, and sending, by the access network device, the 2N-port CSI-RS resource sequence number to a terminal device, where the 2N-port CSI-RS resource sequence number notifies the terminal device of an N-port CSI-RS resource in two adjacent physical resource blocks (PRBs), and N is a positive integer.

20 Claims, 13 Drawing Sheets

(51) Int. Cl.
*H04W 24/10* (2009.01)
*H04W 72/04* (2009.01)

(56) References Cited

FOREIGN PATENT DOCUMENTS

| WO | 2016039586 | A1 |   | 3/2016 |   |   |
|---|---|---|---|---|---|---|
| WO | 2016122257 | A1 |   | 8/2016 |   |   |
| WO | WO-2016122257 | A1 | * | 8/2016 | ............... | H04B 7/06 |
| WO | WO-2017076233 | A1 | * | 5/2017 | ........... | H04L 5/0091 |
| WO | WO-2017167158 | A1 | * | 10/2017 | ............... | H04L 5/00 |
| WO | WO-2017197552 | A1 | * | 11/2017 | ........... | H04L 5/0094 |

OTHER PUBLICATIONS

Ericsson, "CSI-RS design," 3GPP TSG RAN WG1 Meeting #87, R1-1612330; Reno, USA, Nov. 14-18, 2016, 6 pages.*
Intel Corporation, "Discussion on CSI-RS design for NR," 3GPP TSG RAN WG1 Meeting #86-bis, R1-1609528; Lisbon, Portugal, Oct. 10-14, 2016, 6 pages.*
ZTE, "Discussion on non-precoded CSI-RS design for eFD-MIMO," XP051080124, R1-162345, 3GPP TSG RAN WG1 Meeting #84bis, Busan, Korea, Apr. 11-15, 2016, 5 pages.
Foreign Communication From a Counterpart Application, European Application No. 16918175.7, Extended European Search Report dated Aug. 20, 2019, 7 pages.
Machine Translation and Abstract of International Publication No. WO2016122257, Aug. 4, 2016, 139 pages.
Catt, "CSI-RS enhancement for {20,24,28,32} ports," R1-164214, 3GPP TSG RAN WG1 Meeting #85, Nanjing, China, May 23-27, 2016, 4 pages.
NEC, "Proposals for CSI-RS overhead reduction," R1-166633, 3GPP TSG RAN WG1 Meeting #86, Gothenburg, Sweden, Aug. 22-26, 2016, 5 pages.
Huawei, et al.,"CSI-RS pattern design for up to 32 ports," R1-167137, 3GPP TSG RAN WG1 Meeting #86, Göteborg, Sweden, Aug. 22-26, 2016, 4 pages.
Ericsson, "CSI-RS Design for Class A eFD-MIMO," R1-167633, 3GPP TSG-RAN WG1 #86, Gothenburg, Sweden, Aug. 22-26, 2016, 11 pages.
Ericsson, "Performance of CDM-8 for NON-Precoded CSI-RS," R1-167634, 3GPP TSG-RAN WG1#86, Gothenburg, Sweden, Aug. 22-26, 2016, 9 pages.
"3rd Generation Partnership Project; Technical Specification Group Radio Access Network; Evolved Universal Terrestrial Radio Access (E-UTRA); Physical channels and modulation (Release 14)," 3GPP TS 36.211, V14.0.0, Part 1, Sep. 2016, 7 pages.
"3rd Generation Partnership Project; Technical Specification Group Radio Access Network; Evolved Universal Terrestrial Radio Access (E-UTRA); Physical channels and modulation (Release 14)," 3GPP TS 36.211, V14.0.0, Part 2, Sep. 2016, 59 pages.
"3rd Generation Partnership Project; Technical Specification Group Radio Access Network; Evolved Universal Terrestrial Radio Access (E-UTRA); Physical channels and modulation (Release 14)," 3GPP TS 36.211, V14.0.0, Part 3, Sep. 2016, 69 pages.
"3rd Generation Partnership Project; Technical Specification Group Radio Access Network; Evolved Universal Terrestrial Radio Access (E-UTRA); Physical channels and modulation (Release 14)," 3GPP TS 36.211, V14.0.0, Part 4, Sep. 2016, 35 pages.
Foreign Communication From a Counterpart Application, PCT Application No. PCT/CN2016/101607, English Translation of International Search Report dated Jul. 3, 2017, 2 pages.
Foreign Communication From a Counterpart Application, PCT Application No. PCT/CN2016/101607, English Translation of Written Opinion dated Jul. 3, 2017, 4 pages.
R1-153792, Huawei, et al., "CSI-RS design for 12 and 16 ports," 3GPP TSG RAN WGI Meeting #82, Beijing, China, Aug. 24-28, 2015, 5 pages.

* cited by examiner

|  | 00 | 01 | 02 | 03 | 04 | 05 | 06 | 07 | 08 | 09 | 10 | 11 | 12 | 13 |
|---|---|---|---|---|---|---|---|---|---|---|---|---|---|---|
| 11 |  |  |  |  |  |  |  |  |  |  |  |  |  |  |
| 10 |  |  |  |  |  |  |  |  |  |  |  |  |  |  |
| 09 |  |  |  |  |  | 15 | 16 |  |  | 23 | 24 |  | 31 | 32 |
| 08 |  |  |  |  |  | 19 | 20 |  |  | 27 | 28 |  | 35 | 36 |
| 07 (Physical resource block PRB 1) |  |  |  |  |  |  |  |  |  |  |  |  |  |  |
| 06 |  |  |  |  |  |  |  |  |  |  |  |  |  |  |
| 05 |  |  |  |  |  |  |  |  |  |  |  |  |  |  |
| 04 |  |  |  |  |  |  |  |  |  |  |  |  |  |  |
| 03 |  |  |  |  |  | 17 | 18 |  |  | 25 | 26 |  | 33 | 34 |
| 02 |  |  |  |  |  | 21 | 22 |  |  | 29 | 30 |  | 37 | 38 |
| 01 |  |  |  |  |  |  |  |  |  | 37 | 38 |  |  |  |
| 00 |  |  |  |  |  |  |  |  |  | 39 | 40 |  |  |  |
| 11 |  |  |  |  |  |  |  |  |  |  |  |  |  |  |
| 10 |  |  |  |  |  |  |  |  |  |  |  |  |  |  |
| 09 |  |  |  |  |  | 15 | 16 |  |  | 23 | 24 |  | 31 | 32 |
| 08 |  |  |  |  |  | 19 | 20 |  |  | 27 | 28 |  | 35 | 36 |
| 07 (PRB 2) |  |  |  |  |  |  |  |  |  |  |  |  |  |  |
| 06 |  |  |  |  |  |  |  |  |  |  |  |  |  |  |
| 05 |  |  |  |  |  |  |  |  |  |  |  |  |  |  |
| 04 |  |  |  |  |  |  |  |  |  |  |  |  |  |  |
| 03 |  |  |  |  |  | 17 | 18 |  |  | 25 | 26 |  | 33 | 34 |
| 02 |  |  |  |  |  | 21 | 22 |  |  | 29 | 30 |  | 37 | 38 |
| 01 |  |  |  |  |  |  |  |  |  | 37 | 38 |  |  |  |
| 00 |  |  |  |  |  |  |  |  |  | 39 | 40 |  |  |  |

FIG. 9

SIGNAL RESOURCE CONFIGURATION METHOD, TERMINAL, AND ACCESS NETWORK DEVICE

CROSS-REFERENCE TO RELATED APPLICATIONS

This application is a U.S. National Stage of International Patent Application No. PCT/CN2016/101607 filed on Oct. 9, 2016, which is hereby incorporated by reference in its entirety.

TECHNICAL FIELD

The present invention relates to the communications field, and specifically, to a signal resource configuration method, a terminal, and an access network device.

BACKGROUND

Long Term Evolution (Long Term Evolution, LTE) is a long-term evolution of the Universal Mobile Telecommunications System (Universal Mobile Telecommunications System, UMTS) technology standard developed by the 3rd Generation Partnership Project (The 3rd Generation Partnership Project, 3GPP), so that research of a new technology and commercialization for a land mobile communications network can be carried out smoothly. In Release 13 of LTE, a full dimensional MIMO (Full Dimensional MIMO. FD-MIMO) technology is introduced. To be specific, beamforming is performed in both horizontal and vertical dimensions on an access network device side by using a two-dimensional antenna array, and corresponding pre-numbering codebook enhancement, feedback procedure enhancement, and the like are performed accordingly. This can significantly increase a cell capacity. The FD-MIMO of Release 13 supports a maximum of 16 antenna array elements. To measure channel features of the 16 antenna array elements, 16-port channel state information reference signals (Channel State Information Reference Signal, CSI-RS) are designed. In Release 14, increasing a quantity of array elements to {20, 24, 28, 32} is currently being discussed. Therefore, channel measurement of the {20, 24, 28, 32} array elements needs to be supported by CSI-RSs of {20, 24, 28, 32} ports.

In the FD-MIMO of Release 13, a CSI-RS of 16 antenna ports is obtained by aggregating two CSI-RSs of eight antenna ports, and a CSI-RS of 12 antenna ports is obtained by aggregating three CSI-RSs of four antenna ports. In addition, to ensure power of a CSI-RS on each OFDM symbol, orthogonal codes are used for the 16 antenna ports and the 12 antenna ports to perform code division multiplexing (Code Divide Multiplexing, CDM) on reference signals of a plurality of ports in a same time-frequency resource group, to improve power. In an existing CSI-RS resource technical solution, an 8-port CSI-RS for aggregating a 32-port CSI-RS is redefined, four newly-defined 8-port CSI-RSs are used to aggregate the 32-port CSI-RS, and CDM-8 is used for code division multiplexing on the newly-defined 8-port CSI-RSs, to effectively use power. Based on 32 ports, three CDMs are removed from each CDM group and not used, to obtain 20 ports. Based on 32 ports, two CDMs are removed from each CDM group and not used, to obtain 24 ports. Based on 32 ports, one CDM is removed from each CDM group and not used, to obtain 28 ports. In other words, CSI-RS resource elements occupied by the 20 ports, the 24 ports, and the 28 ports are exactly consistent with those occupied by the 32 ports.

However, although CDM-8 can be used for code division multiplexing on the redefined 8-port CSI-RSs used for aggregation to effectively use power, it has greater impact on an original standard. In addition, when there are less than 32 ports, for example, 20 ports, occupancy of CSI-RS resource elements is consistent with that of the 32 ports. Actually, three CDMs are removed from each CDM group and not used, to obtain 20 ports. Consequently, consumption of invalid resources of CSI-RSs increases.

SUMMARY

The present invention provides a signal resource configuration method, a terminal, and an access network device, to reduce impact on an existing standard and save CSI-RS resources.

A first aspect of the present invention provides a signal resource configuration method, including:

sending, by an access network device, a 2N-port CSI-RS resource sequence number to a terminal device, where the 2N-port CSI-RS resource sequence number is used to notify the terminal device of an N-port CSI-RS resource in two adjacent PRBs. and N is a positive integer.

The access network device sends the 2N-port CSI-RS resource sequence number to the terminal device, so that the terminal device can determine the N-port CSI-RS resource in the two adjacent physical resource blocks (Physical Resource Block, PRB). The 2N-port CSI-RS resource is obtained by aggregating N-port CSI-RS sub-resources in different PRBs. Therefore, in the prior art, when CSI-RS resources of 24 and 32 ports are obtained by aggregating 8-port CSI-RS resources, CSI-RS resources of 20 and 28 ports can also be configured by using a plurality of 8-port resource sequence numbers, so as to reduce signaling overheads, and cause less impact on an existing standard. However, in comparison with the prior art, in a case of 20 ports, during a CDM-8 configuration, there is no need to remove three CDMs from each CDM group; and in a case of 28 ports, there is no need to remove one CDM from each CDM group. Therefore, in this solution, in a case of 4(2K+1) ports, for example, 20 ports or 28 ports, there is no waste of resources.

With reference to the first aspect of the present invention, in a first implementation of the first aspect of the present invention, the 2N-port CSI-RS resource sequence number is used to indicate a 2N-port CSI-RS resource in two different PRBs; and the 2N-port CSI-RS resource is a first N-port CSI-RS sub-resource in a first PRB and a second N-port CSI-RS sub-resource in a second PRB; or the 2N-port CSI-RS resource is a half of a first 2N-port CSI-RS sub-resource in a first PRB and a half of a second 2N-port CSI-RS sub-resource in the second PRB.

It is assumed that the N-port CSI-RS sub-resources in the two PRBs are 4-port CSI-RS sub-resources. A first 4-port CSI-RS sub-resource in the first PRB and a second 4-port CSI-RS sub-resource in the second PRB are aggregated to obtain an 8-port CSI-RS resource, and the first 4-port CSI-RS sub-resource and the second 4-port CSI-RS sub-resource have a same time-frequency domain location. Alternatively, a half of a first 8-port CSI-RS sub-resource in the first PRB and a half of a second 8-port CSI-RS sub-resource in the second PRB are aggregated to obtain an 8-port CSI-RS resource, the half of the first 8-port CSI-RS sub-resource and the half of the second 8-port CSI-RS sub-resource have a same time-frequency domain location, and locations for intercepting the halves are also the same. Advantages of this lie in that for a terminal device of a release earlier than Release 14, the resources may be considered as silent CSI-RS resources, so that no additional pilot overheads of the terminal device are increased.

With reference to the first implementation of the first aspect of the present invention, in a second implementation of the first aspect of the present invention, the signal resource configuration method further includes:

configuring, by the access network device, a plurality of 2N-port CSI-RS resources to obtain a 4(2K+1)-port CSI-RS resource, where the plurality of 2N-port CSI-RS resources include a first CSI-RS resource and a second CSI-RS resource, the first CSI-RS resource is a 2N-port CSI-RS resource in a same PRB, the second CSI-RS resource is a 2N-port CSI-RS resource in two different PRBs, and K is a positive integer; and sending, by the access network device, resource sequence numbers of the plurality of 2N-port CSI-RS resources to the terminal device.

Before sending the 2N-port CSI-RS resource sequence number, the access network device needs to configure the 2N-port CSI-RS resources to obtain the 4(2K+1)-port CSI-RS resource through aggregation. The 2N-port CSI-RS resources include the first CSI-RS resource and the second CSI-RS resource, and the first CSI-RS resource is a 2N-port CSI-RS resource in a same PRB. A first implementation is shown in FIG. 8. For a 20-port CSI-RS resource, a 4-port CSI-RS resource {31, 32} and {33, 34} in a PRB 1 and a 4-port CSI-RS resource {31, 32} and {33, 34} in a PRB 2 are aggregated to form an 8-port CSI-RS resource. The second CSI-RS resource is a 2N-port CSI-RS resource in two different PRBs, and K is a positive integer. After obtaining the 4(2K+1)-port CSI-RS resource, the access network device sends the resource sequence numbers of the plurality of 2N-port CSI-RS resources to the terminal device, so that the terminal device can determine the 4(2K+1)-port CSI-RS resource based on the resource sequence numbers of the plurality of 2N-port CSI-RS resources.

With reference to the second implementation of the first aspect of the present invention, in a third implementation of the first aspect of the present invention, after the configuring, by the access network device, a plurality of 2N-port CSI-RS resources to obtain a 4(2K+1)-port CSI-RS resource, the method further includes: performing, by the access network device, port numbering on the 4(2K+1)-port CSI-RS resource, where the performing, by the access network device, port numbering on the 4(2K+1)-port CSI-RS resource includes:

numbering, by the access network device, a port corresponding to the first CSI-RS resource; and numbering, by the access network device, a port corresponding to the second CSI-RS resource.

According to a preset numbering rule, the access network device needs to preferentially number a port corresponding to a 2N-port CSI-RS resource (that is, the first CSI-RS resource) in a same PRB, and then number a port corresponding to a 2N-port CSI-RS resource (that is, the second CSI-RS resource) in two different PRBs. Advantages of this lie in that better forward compatibility can be ensured, and the preset numbering rule is known to both the access network device and the terminal device.

With reference to the second implementation of the first aspect of the present invention, in a fourth implementation of the first aspect of the present invention, after the configuring, by the access network device, a plurality of 2N-port CSI-RS resources to obtain a 4(2K+1)-port CSI-RS resource, the method further includes:

performing, by the access network device, a CDM configuration on the 4(2K+1)-port CSI-RS resource, where the performing, by the access network device, a CDM configuration on the 4(2K+1)-port CSI-RS resource includes:

configuring, by the access network device, 2N-CDM for the first CSI-RS resource; and configuring, by the access network device, N-CDM for the second CSI-RS resource, and increasing transmit power by 3 dB for the second CSI-RS resource.

Because the first CSI-RS resource is a 2N-port CSI-RS resource in a same PRB, 2N-CDM is configured. However, to save CDM resources, for the second CSI-RS resource that is a 2N-port CSI-RS resource in two different PRBs, N-CDM is configured and power is amplified by 3 dB. This can ensure consistent power on all ports. To ensure channel state consistency between resource elements (RE) crossed by CDM, a frequency domain span needs to be reduced as much as possible, and a maximum interval does not exceed six subcarriers (that is, six REs).

A second aspect of the present invention provides a signal resource configuration method, including:

receiving, by a terminal device, a 2N-port CSI-RS resource sequence number sent by an access network device; and determining, by the terminal device based on the 2N-port CSI-RS resource sequence number, an N-port CSI-RS resource in two adjacent physical resource blocks PRBs, where N is a positive integer.

The terminal device receives the 2N-port CSI-RS resource sequence number sent by the access network device. Because the 2N-port CSI-RS resource sequence number is used to indicate an N-port CSI-RS resource in two adjacent PRBs, the terminal device may determine, based on the 2N-port CSI-RS resource sequence number, the N-port CSI-RS resource in the two adjacent PRBs. The 2N-port CSI-RS resource is obtained by aggregating N-port CSI-RS sub-resources in different PRBs. Therefore, in the prior art, in a case of 8-port CSI-RS resources and 8-CDM (CDM-4), the 8-port CSI-RS resources can be sorted by using one 8-port resource sequence number without redefinition, thereby causing less impact on an existing standard. However, in comparison with the prior art, in a case of 20 ports, during a CDM-8 configuration, there is no need to remove three CDMs from each CDM group; and in a case of 28 ports, there is no need to remove one CDM from each CDM group. Therefore, in this solution, in a case of 4(2K+1) ports, for example, 20 ports or 28 ports, there is no waste of resources.

With reference to the second aspect of the present invention, in a first implementation of the second aspect of the present invention, the 2N-port CSI-RS resource sequence number is used to indicate a 2N-port CSI-RS resource in two different PRBs; and the 2N-port CSI-RS resource is a first N-port CSI-RS sub-resource in a first PRB and a second N-port CSI-RS sub-resource in a second PRB; or the 2N-port CSI-RS resource is a half of a first 2N-port CSI-RS sub-resource in a first PRB and a half of a second 2N-port CSI-RS sub-resource in the second PRB.

It is assumed that N-port CSI-RS resources in the two PRBs are 4-port CSI-RS resources. A first 4-port CSI-RS sub-resource in the first PRB and a second 4-port CSI-RS sub-resource in the second PRB are aggregated to obtain an 8-port CSI-RS resource, and the first 4-port CSI-RS sub-resource and the second 4-port CSI-RS sub-resource have a same time-frequency domain location. Alternatively, a half of a first 8-port CSI-RS sub-resource in the first PRB and a half of a second 8-port CSI-RS sub-resource in the second PRB are aggregated to obtain an 8-port CSI-RS resource, the half of the first 8-port CSI-RS sub-resource and the half of the second 8-port CSI-RS sub-resource have a same time-frequency domain location, and locations for intercepting the halves are also the same. Advantages of this lie in that for a terminal device of a release earlier than Release 14, the resources may be considered as silent CSI-RS resources, so that no additional pilot overheads of the terminal device are increased.

With reference to the first implementation of the second aspect of the present invention, in a second implementation of the second aspect of the present invention, the signal resource configuration method further includes:

receiving, by the terminal device, resource sequence numbers of a plurality of 2N-port CSI-RS resources; and obtaining, by the terminal device, a 4(2K+1)-port CSI-RS resource based on the resource sequence numbers of the plurality of 2N-port CSI-RS resources, where the 4(2K+1)-port CSI-RS resource is obtained by configuring the plurality of 2N-port CSI-RS resources, the plurality of 2N-port CSI-RS resources include a first CSI-RS resource and a second CSI-RS resource, the first CSI-RS resource is a 2N-port CSI-RS resource in a same PRB, the second CSI-RS resource is a 2N-port CSI-RS resource in two different PRBs, and K is a positive integer.

Before sending the 2N-port CSI-RS resource sequence number, because there are a plurality of 2N-port CSI-RS resources, the access network device needs to configure the plurality of 2N-port CSI-RS resources to obtain the 4(2K+1)-port CSI-RS resource, and send the resource sequence numbers of the plurality of 2N-port CSI-RS resources to the terminal device. The terminal device can obtain the 4(2K+1)-port CSI-RS resource based on the resource sequence numbers of the plurality of 2N-port CSI-RS resources. The plurality of 2N-port CSI-RS resources include the first CSI-RS resource and the second CSI-RS resource. The first CSI-RS resource is a 2N-port CSI-RS resource in a same PRB, the second CSI-RS resource is a 2N-port CSI-RS resource in two different PRBs, and K is a positive integer.

With reference to the second implementation of the second aspect of the present invention, in a third implementation of the second aspect of the present invention, after the obtaining, by the terminal device, a 4(2K+1)-port CSI-RS resource based on the resource sequence numbers of the plurality of 2N-port CSI-RS resources, the method further includes:

performing, by the terminal device, port numbering on the 4(2K+1)-port CSI-RS resource, where the performing, by the terminal device, port numbering on the 4(2K+1)-port CSI-RS resource includes:

numbering, by the terminal device, a port corresponding to the first CSI-RS resource; and numbering, by the terminal device, a port corresponding to the second CSI-RS resource.

Before sending the 2N-port CSI-RS resource sequence number, the access network device configures the 2N-port CSI-RS resources according to a preset numbering rule to obtain the 4(2K+1)-port CSI-RS resource. Because the preset numbering rule is well known, according to the numbering rule, the terminal device preferentially numbers a port corresponding to a 2N-port CSI-RS resource (that is, the first CSI-RS resource) in a same PRB, and then numbers a port corresponding to a 2N-port CSI-RS resource (that is, the second CSI-RS resource) in two different PRBs. Advantages of this lie in that better forward compatibility can be ensured, and the preset numbering rule is known to both the access network device and the terminal device.

With reference to the second implementation of the second aspect of the present invention, in a fourth implementation of the second aspect of the present invention, after the obtaining, by the terminal device, a 4(2K+1)-port CSI-RS resource based on the resource sequence numbers of the plurality of 2N-port CSI-RS resources, the method further includes:

obtaining, by the terminal device, a CDM configuration of the 4(2K+1)-port CSI-RS resource, where the CDM configuration of the 4(2K+1)-port CSI-RS resource includes a 2N-CDM manner used for the first CSI-RS resource and an N-CDM manner used for the second CSI-RS resource.

The CDM configuration of the 4(2K+1)-port CSI-RS resource is used by the access network device when the access network device sends the 2N-port CSI-RS resource sequence number. In addition, the CDM configuration performed by the access network device on the 4(2K+1)-port CSI-RS resource is well known, and therefore the CDM configuration of the 4(2K+1)-port CSI-RS resource is known to the terminal device. Because the first CSI-RS resource is a 2N-port CSI-RS resource in a same PRB, to ensure channel state consistency between resource elements (RE) crossed by CDM, a frequency domain span needs to be reduced as much as possible, and a maximum interval does not exceed six subcarriers (that is, six REs). Therefore, the 2N-CDM manner is used for the first CSI-RS resource. However, to save CDM resources, for the second CSI-RS resource that is a 2N-port CSI-RS resource in two different PRBs, the N-CDM manner is used and power is amplified by 3 dB. This can ensure consistent power on all ports.

A third aspect of the present invention provides an access network device, including:

a sending module, configured to send a 2N-port channel measurement pilot signal CSI-RS resource sequence number to a terminal device, where the 2N-port CSI-RS resource sequence number is used to notify the terminal device of an N-port CSI-RS resource in two adjacent physical resource blocks PRBs, and N is a positive integer.

The sending module sends the 2N-port CSI-RS resource sequence number to the terminal device, so that the terminal device can determine the N-port CSI-RS resource in the two adjacent PRBs. The 2N-port CSI-RS resource is obtained by aggregating N-port CSI-RS sub-resources in different PRBs. Therefore, in the prior art, when CSI-RS resources of 24 and 32 ports are obtained by aggregating 8-port CSI-RS resources, CSI-RS resources of 20 and 28 ports can also be configured by using a plurality of 8-port resource sequence numbers, so as to reduce signaling overheads, and cause less impact on an existing standard. However, in comparison with the prior art, in a case of 20 ports, during a CDM-8 configuration, there is no need to remove three CDMs from each CDM group; and in a case of 28 ports, there is no need to remove one CDM from each CDM group. Therefore, in this solution, in a case of 4(2K+1) ports, for example, 20 ports or 28 ports, there is no waste of resources.

With reference to the third aspect of the present invention, in a first implementation of the third aspect of the present invention, the 2N-port CSI-RS resource sequence number is used to indicate a 2N-port CSI-RS resource in two different PRBs; and the 2N-port CSI-RS resource is a first N-port CSI-RS sub-resource in a first PRB and a second N-port CSI-RS sub-resource in a second PRB; or the 2N-port CSI-RS resource is a half of a first 2N-port CSI-RS sub-resource in a first PRB and a half of a second 2N-port CSI-RS sub-resource in the second PRB.

It is assumed that N-port CSI-RS resources in the two PRBs are 4-port CSI-RS resources. A first 4-port CSI-RS sub-resource in the first PRB and a second 4-port CSI-RS sub-resource in the second PRB are aggregated to obtain an 8-port CSI-RS resource, and the first 4-port CSI-RS sub-resource and the second 4-port CSI-RS sub-resource have a same time-frequency domain location. Alternatively, a half of a first 8-port CSI-RS sub-resource in the first PRB and a half of a second 8-port CSI-RS sub-resource in the second PRB are aggregated to obtain an 8-port CSI-RS resource, the half of the first 8-port CSI-RS sub-resource and the half of the second 8-port CSI-RS sub-resource have a same time-frequency domain location, and locations for intercepting the halves are also the same. Advantages of this lie in that for a terminal device of a release earlier than Release 14, the resources may be considered as silent CSI-RS resources, so that no additional pilot overheads of the terminal device are increased.

With reference to the first implementation of the third aspect of the present invention, in a second implementation of the third aspect of the present invention, the access network device further includes:

a processing module, configured to configure a plurality of 2N-port CSI-RS resources to obtain a 4(2K+1)-port CSI-RS resource, where the plurality of 2N-port CSI-RS resources include a first CSI-RS resource and a second CSI-RS resource, the first CSI-RS resource is a 2N-port CSI-RS resource in a same PRB, the second CSI-RS resource is a 2N-port CSI-RS resource in two different PRBs. and K is a positive integer; and the sending module is further configured to send resource sequence numbers of the plurality of 2N-port CSI-RS resources to the terminal device.

Before the sending module sends the 2N-port CSI-RS resource sequence number, because there are a plurality of 2N-port CSI-RS resources, the processing module needs to configure the 2N-port CSI-RS resources to obtain the 4(2K+1)-port CSI-RS resource. The N-port CSI-RS resources include the first CSI-RS resource and the second CSI-RS resource. The first CSI-RS resource is a 2N-port CSI-RS resource in a same PRB, the second CSI-RS resource is a 2N-port CSI-RS resource in two different PRBs, and K is a positive integer. After obtaining the 4(2K+1)-port CSI-RS resource, the sending module sends the resource sequence numbers of the plurality of 2N-port CSI-RS resources to the terminal device, so that the terminal device can determine the 4(2K+1)-port CSI-RS resource based on the resource sequence numbers of the plurality of 2N-port CSI-RS resources.

With reference to the second implementation of the third aspect of the present invention, in a third implementation of the third aspect of the present invention, the processing module is further configured to perform port numbering on the 4(2K+1)-port CSI-RS resource; and the processing module includes:

a numbering unit, configured to number a port corresponding to the first CSI-RS resource; where the numbering unit is further configured to number a port corresponding to the second CSI-RS resource.

According to a preset numbering rule, the numbering unit in the processing module needs to preferentially number a port corresponding to a 2N-port CSI-RS resource (that is, the first CSI-RS resource) in a same PRB, and then number a port corresponding to a 2N-port CSI-RS resource (that is, the second CSI-RS resource) in two different PRBs. Advantages of this lie in that better forward compatibility can be ensured, and the preset numbering rule is known to both the access network device and the terminal device.

With reference to the second implementation of the third aspect of the present invention, in a fourth implementation of the third aspect of the present invention, the processing module is further configured to perform a CDM configuration on the 4(2K+1)-port CSI-RS resource; and the processing module includes:

a CDM configuration unit, configured to configure 2N-CDM for the first CSI-RS resource; where the CDM configuration unit is further configured to: configure N-CDM for the second CSI-RS resource, and increase transmit power by 3 dB for the second CSI-RS resource.

Because the first CSI-RS resource is a 2N-port CSI-RS resource in a same PRB, the CDM configuration unit in the processing module configures 2N-CDM for the 4(2K+1)-port CSI-RS resource. However, to save CDM resources, for the second CSI-RS resource that is a 2N-port CSI-RS resource in two different PRBs, the processing module can configure N-CDM and amplify power by 3 dB for the 4(2K+1)-port CSI-RS resource. This can ensure consistent power on all ports. In addition, to ensure channel state consistency between resource elements (RE) crossed by CDM, a frequency domain span needs to be reduced as much as possible, and a maximum interval does not exceed six subcarriers (that is, six REs).

A fourth aspect of the present invention provides a terminal device, including:

a receiving module, configured to receive a 2N-port CSI-RS resource sequence number sent by an access network device; and a processing module, configured to determine, based on the 2N-port CSI-RS resource sequence number, an N-port CSI-RS resource in two adjacent PRBs, where N is a positive integer.

The receiving module receives a resource sequence number and 2N-port configuration information sent by the access network device. The resource sequence number is used to indicate a 2N-port channel measurement pilot signal CSI-RS resource, and the 2N-port configuration information is used to indicate a 2N-code division multiplexing CDM configuration of a 2N-port CSI-RS resource. The N-port CSI-RS resource is obtained by aggregating two N-port CSI-RS sub-resources in different PRBs, and the processing module determines a 2N-port CSI-RS configuration. The 2N-port CSI-RS resource is obtained by aggregating N-port CSI-RS resources in different PRBs. Therefore, in the prior art, when CSI-RS resources of 24 and 32 ports are obtained by aggregating 8-port CSI-RS resources, CSI-RS resources of 20 and 28 ports can also be configured by using a plurality of 8-port resource sequence numbers, so as to reduce signaling overheads, and cause less impact on an existing standard. However, in comparison with the prior art, in a case of 20 ports, during a CDM-8 configuration, there is no need to remove three CDMs from each CDM group; and in a case of 28 ports, there is no need to remove one CDM from each CDM group. Therefore, in this solution, in a case of 4(2N+1) ports, for example, 20 ports or 28 ports, there is no waste of resources.

With reference to the fourth aspect of the present invention, in a first implementation of the fourth aspect of the present invention, the 2N-port CSI-RS resource sequence number is used to indicate a 2N-port CSI-RS resource in two different PRBs; and the 2N-port CSI-RS resource is a first N-port CSI-RS sub-resource in a first PRB and a second N-port CSI-RS sub-resource in a second PRB; or the 2N-port CSI-RS resource is a half of a first 2N-port CSI-RS sub-resource in a first PRB and a half of a second 2N-port CSI-RS sub-resource in the second PRB.

It is assumed that N-port CSI-RS resources in the two PRBs are 4-port CSI-RS resources. A first 4-port CSI-RS sub-resource in the first PRB and a second 4-port CSI-RS sub-resource in the second PRB are aggregated to obtain an 8-port CSI-RS resource, and the first 4-port CSI-RS sub-resource and the second 4-port CSI-RS sub-resource have a same time-frequency domain location. Alternatively, a half of a first 8-port CSI-RS sub-resource in the first PRB and a half of a second 8-port CSI-RS sub-resource in the second PRB are aggregated to obtain an 8-port CSI-RS resource, the half of the first 8-port CSI-RS sub-resource and the half of the second 8-port CSI-RS sub-resource have a same time-frequency domain location, and locations for intercepting the halves are also the same. Advantages of this lie in that for a terminal device of a release earlier than Release 14, the resources may be considered as silent CSI-RS resources, so that no additional pilot overheads of the terminal device are increased.

With reference to the first implementation of the fourth aspect of the present invention, in a second implementation of the fourth aspect of the present invention, the receiving module is further configured to receive resource sequence numbers of a plurality of 2N-port CSI-RS resources; and the processing module is further configured to obtain a 4(2K+1)-port CSI-RS resource based on the resource sequence numbers of the plurality of 2N-port CSI-RS resources, where the 4(2K+1)-port CSI-RS resource is obtained by configuring the plurality of 2N-port CSI-RS resources, the plurality of 2N-port CSI-RS resources include a first CSI-RS resource and a second CSI-RS resource, the first CSI-RS resource is a 2N-port CSI-RS resource in a same PRB, the second CSI-RS resource is a 2N-port CSI-RS resource in two different PRBs, and K is a positive integer.

Before sending the 2N-port CSI-RS resource sequence number, because there are a plurality of 2N-port CSI-RS resources, the access network device needs to configure the plurality of 2N-port CSI-RS resources to obtain the 4(2K+1)-port CSI-RS resource, and send the resource sequence numbers of the plurality of 2N-port CSI-RS resources to the terminal device. The processing module can obtain the 4(2K+1)-port CSI-RS resource based on the resource sequence numbers that are of the plurality of 2N-port CSI-RS resources and that are received by the receiving module. The plurality of 2N-port CSI-RS resources include the first CSI-RS resource and the second CSI-RS resource. The first CSI-RS resource is a 2N-port CSI-RS resource in a same PRB, the second CSI-RS resource is a 2N-port CSI-RS resource in two different PRBs, and K is a positive integer.

With reference to the second implementation of the fourth aspect of the present invention, in a third implementation of the fourth aspect of the present invention, the processing module is further configured to perform port numbering on the 4(2K+1)-port CSI-RS resource; and
the processing module includes:

a numbering unit, configured to number a port corresponding to the first CSI-RS resource; where the numbering unit is further configured to number a port corresponding to the second CSI-RS resource.

Before sending the 2N-port CSI-RS resource sequence number, the access network device configures the 2N-port CSI-RS resources according to a preset numbering rule to obtain the 4(2K+1)-port CSI-RS resource. Because the preset numbering rule is well known, according to the numbering rule, the numbering unit in the processing module preferentially numbers a port corresponding to a 2N-port CSI-RS resource (that is, the first CSI-RS resource) in a same PRB, and then numbers a port corresponding to a 2N-port CSI-RS resource (that is, the second CSI-RS resource) in two different PRBs. Advantages of this lie in that better forward compatibility can be ensured, and the preset numbering rule is known to both the access network device and the terminal device.

With reference to the second implementation of the fourth aspect of the present invention, in a fourth implementation of the fourth aspect of the present invention, the processing module is further configured to obtain a CDM configuration of the 4(2K+1)-port CSI-RS resource, where the CDM configuration of the 4(2K+1)-port CSI-RS resource includes a 2N-CDM manner used for the first CSI-RS resource and an N-CDM manner used for the second CSI-RS resource.

The CDM configuration of the 4(2K+1)-port CSI-RS resource is sent by the access network device. In addition, a specific implementation in which a 2N-CDM configuration is performed on the 4(2K+1)-port CSI-RS resource is well known, and therefore the CDM configuration of the 4(2K+1)-port CSI-RS resource is known to the processing module. Because the first CSI-RS resource is a 2N-port CSI-RS resource in a same PRB, the 2N-CDM manner is used for the first CSI-RS resource. However, to save CDM resources, for the second CSI-RS resource that is a 2N-port CSI-RS resource in two different PRBs, the N-CDM manner is used and power is amplified by 3 dB. This can ensure consistent power on all ports. In addition, to ensure channel state consistency between resource elements (RE) crossed by CDM, a frequency domain span needs to be reduced as much as possible, and a maximum interval does not exceed six subcarriers (that is, six REs).

A fifth aspect of the present invention provides an access network device, including a processor, a transmitter, and a memory, where the memory may be configured to store code to be executed by the processor; and the transmitter is configured to send a 2N-port CSI-RS resource sequence number to a terminal device, where the 2N-port CSI-RS resource sequence number is used to notify the terminal device of an N-port CSI-RS resource in two adjacent PRBs, and N is a positive integer.

The transmitter sends the 2N-port CSI-RS resource sequence number to the terminal device, so that the terminal device can determine the N-port CSI-RS resource in the two adjacent PRBs. The 2N-port CSI-RS resource is obtained by aggregating N-port CSI-RS sub-resources in different PRBs. Therefore, in the prior art, when CSI-RS resources of 24 and 32 ports are obtained by aggregating 8-port CSI-RS resources, CSI-RS resources of 20 and 28 ports can also be configured by using a plurality of 8-port resource sequence numbers, so as to reduce signaling overheads, and cause less impact on an existing standard. However, in comparison with the prior art, in a case of 20 ports, during a CDM-8 configuration, there is no need to remove three CDMs from each CDM group; and in a case of 28 ports, there is no need to remove one CDM from each CDM group. Therefore, in this solution, in a case of 4(2K+1) ports, for example, 20 ports or 28 ports, there is no waste of resources.

A fifth aspect of the present invention provides a terminal device, including a processor, a receiver, and a memory, where the memory may be configured to store code to be executed by the processor;

the receiver is configured to receive a 2N-port CSI-RS resource sequence number sent by an access network device; and the processor is configured to determine, based on the 2N-port CSI-RS resource sequence number, an N-port CSI-RS resource in two adjacent PRBs, where N is a positive integer.

The receiver receives a resource sequence number and 2N-port configuration information sent by the access network device. The resource sequence number is used to indicate a 2N-port channel measurement pilot signal CSI-RS resource, and the 2N-port configuration information is used to indicate a 2N-code division multiplexing CDM configuration of a 2N-port CSI-RS resource. The N-port CSI-RS resource is obtained by aggregating two N-port CSI-RS resources in different physical resource blocks PRBs, and the processor determines a 2N-port CSI-RS configuration. The 2N-port CSI-RS resource is obtained by aggregating N-port CSI-RS sub-resources in different PRBs. Therefore, in the prior art, when CSI-RS resources of 24 and 32 ports are obtained by aggregating 8-port CSI-RS resources, CSI-RS resources of 20 and 28 ports can also be configured by using a plurality of 8-port resource sequence numbers, so as to reduce signaling overheads, and cause less impact on an existing standard. However, in comparison with the prior art, in a case of 20 ports, during a CDM-8 configuration, there is no need to remove three CDMs from each CDM group; and in a case of 28 ports, there is no need to remove one CDM from each CDM group. Therefore, in this solution, in a case of 4(2N+1) ports, for example, 20 ports or 28 ports, there is no waste of resources.

BRIEF DESCRIPTION OF DRAWINGS

To describe the technical solutions in the embodiments of the present invention more clearly, the following briefly describes the accompanying drawings required for describing the embodiments and the prior art. Apparently, the accompanying drawings in the following description show merely some embodiments of the present invention, and a person of ordinary skill in the art may derive other drawings from these accompanying drawings without creative efforts.

FIG. 6 is a schematic diagram of a manner of cross-PRB 4-port CSI-RS resource aggregation according to this application;

FIG. 7 is a schematic diagram of another manner of cross-PRB 4-port CSI-RS resource aggregation according to this application;

FIG. 8 is a schematic diagram of 4-port CSI-RS resource aggregation for 20 ports according to this application:

FIG. 9 is a schematic diagram of 4-port CSI-RS resource aggregation for 28 ports according to this application;

DESCRIPTION OF EMBODIMENTS

The present invention provides a signal resource configuration method, a terminal, and an access network device, to reduce impact on an existing standard and save CSI-RS resources.

To make a person skilled in the art understand the technical solutions in the present invention better, the following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

A system architecture or a scenario to which the present invention is applied is first briefly described.

Figure 1:
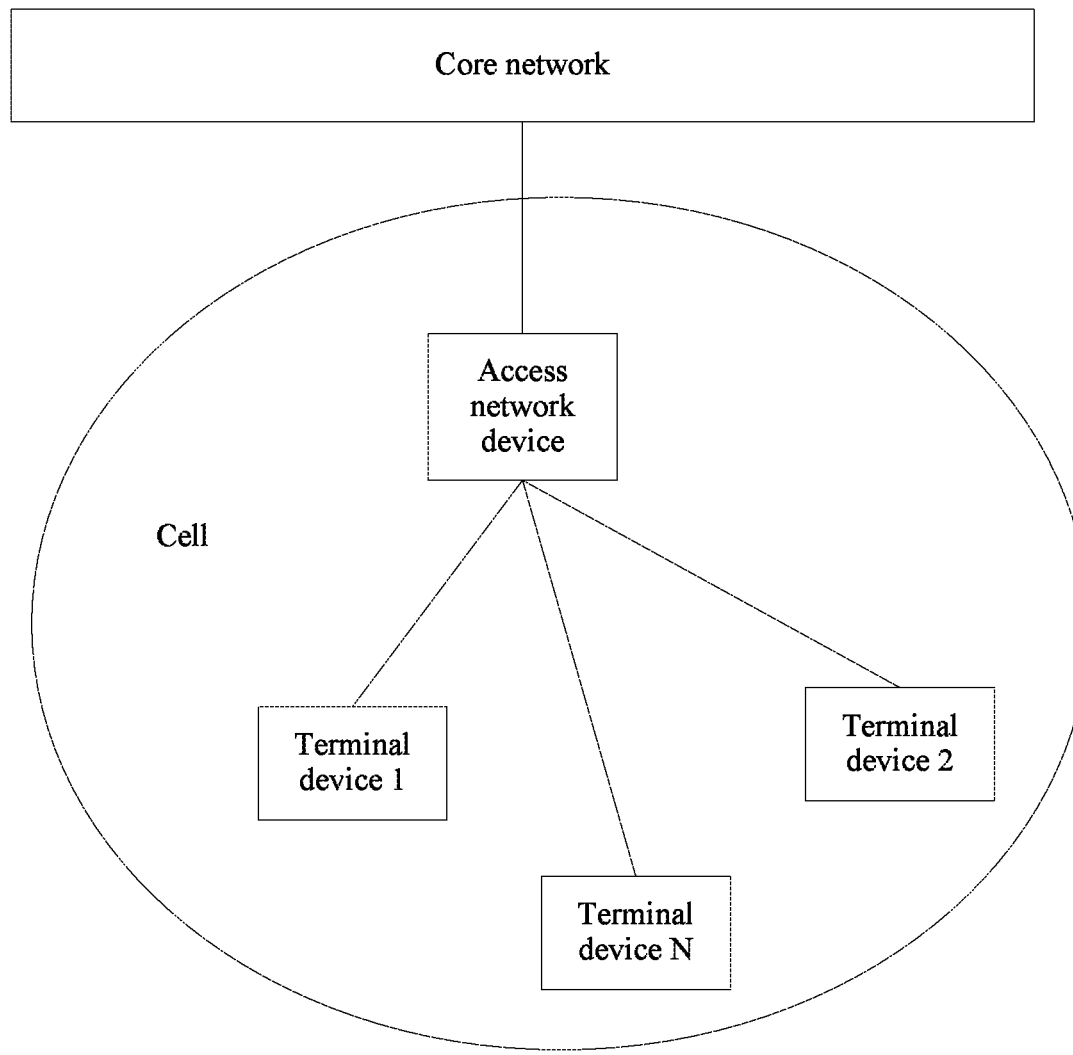
FIG. 1 is a schematic diagram of an application scenario or an architecture according to this application.

The present invention is applied to a wireless communications network system, and may be applied to an LTE system and any terminal device and access network device based on an LTE standard. As shown in FIG. 1, an access network device is connected to a core network, a cell covered by the access network device includes N terminal devices, and the access network device establishes a communication link to each terminal device.

The access network device may be a network device in a cell, or may be a base station in a cell sense or a network device having a function similar to that of a base station, such as a wireless router and a wireless access point (Access Point, AP). The access network device may be a network device that provides wireless access and a communication service for a mobile or fixed terminal device in the cell.

The terminal device may be a mobile phone, an intelligent terminal, a multimedia device, a streaming media device, an MTC terminal device, or the like.

In Release 13 of LTE, a D-MIMO technology is introduced. To be specific, beamforming is performed in both horizontal and vertical dimensions on an access network device by using a two-dimensional antenna array, and corresponding precoding codebook enhancement, feedback procedure enhancement, and the like are performed accordingly. This can significantly increase a cell capacity. FD-MIMO of Release 13 supports a maximum of 16 antenna array elements. To measure channel features of the 16 antenna array elements, 16-port channel state information reference signals (Channel State Information Reference Signal, CSI-RS) are designed. In Release 14, increasing a quantity of array elements to {20, 24, 28, 32} is currently being discussed. Therefore, channel measurement of the {20, 24, 28, 32} array elements needs to be supported by CSI-RSs of {20, 24, 28, 32} ports.

Figure 2:
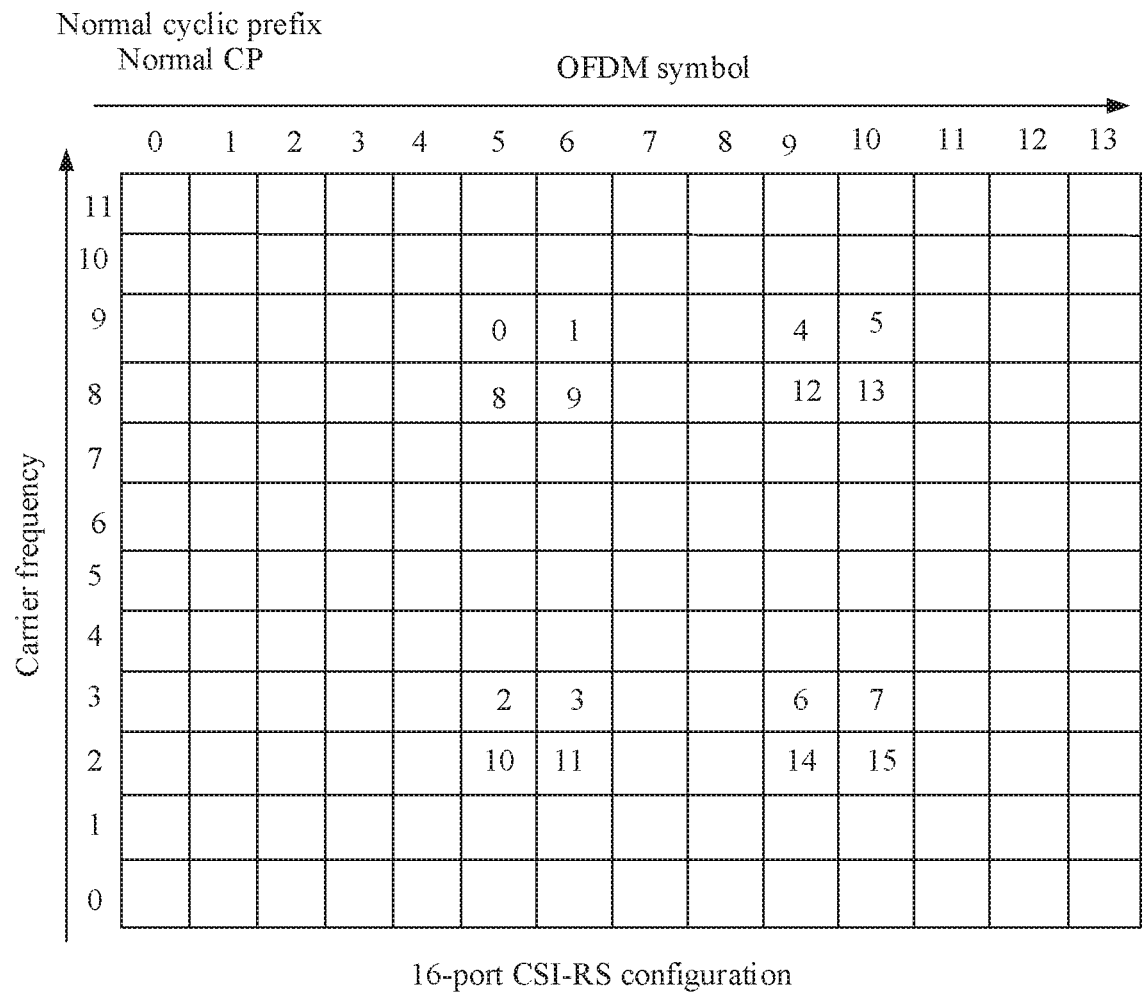
FIG. 2 is a schematic diagram of a 16-port CSI-RS configuration according to this application.
Figure 3:
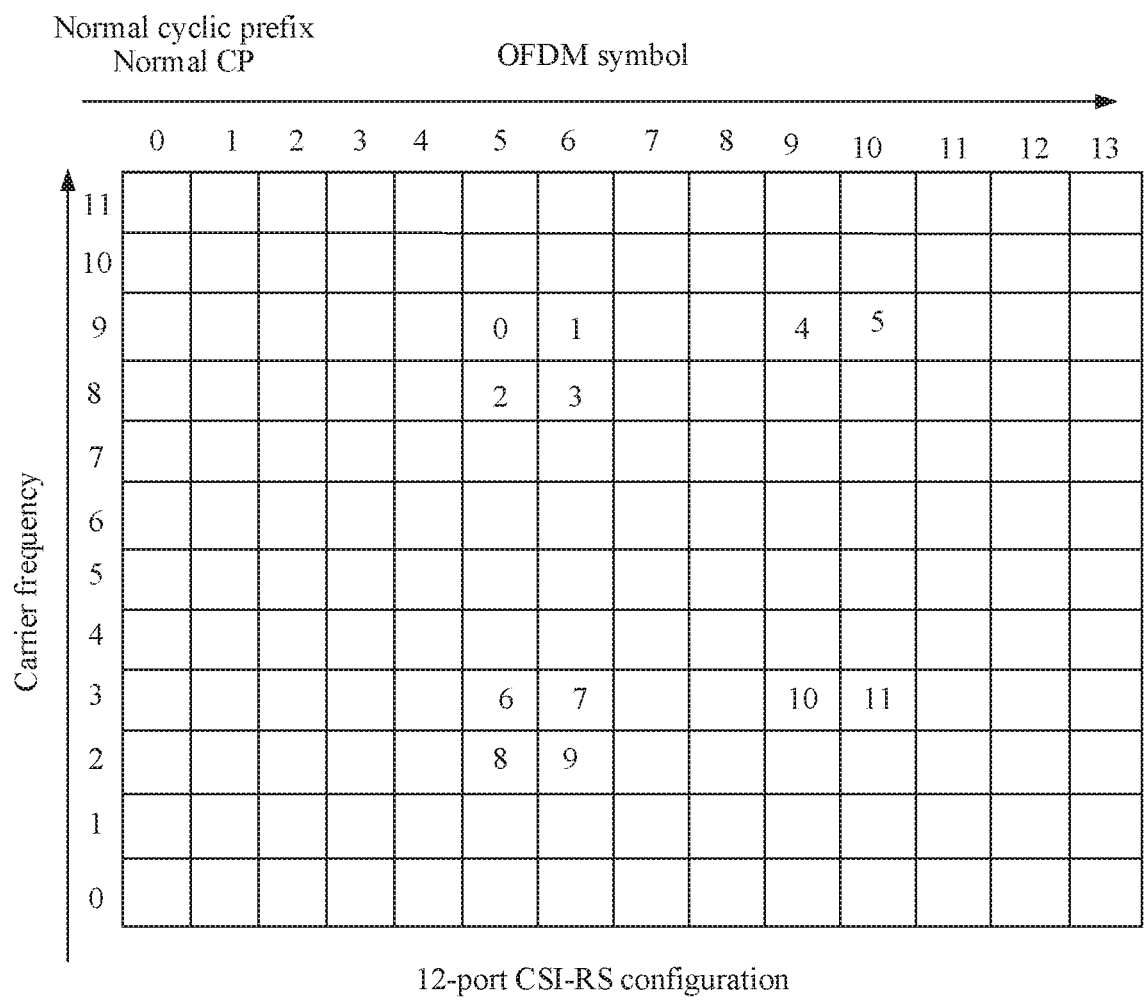
FIG. 3 is a schematic diagram of a 12-port CSI-RS configuration according to this application.

In the FD-MIMO of Release 13, a CSI-RS of 16 antenna ports is obtained by aggregating two CSI-RSs of eight antenna ports, and a CSI-RS of 12 antenna ports is obtained by aggregating three CSI-RSs of four antenna ports. In addition, to ensure power of a CSI-RS on each OFDM symbol, orthogonal codes are used for the 16 antenna ports and the 12 antenna ports to perform CDM on reference signals of a plurality of ports in a same time-frequency resource group, to improve power. FIG. 2 shows a case of CDM-2. For CDM-4, a 16-port aggregation manner is {0, 1, 4, 5}, {2, 3, 6, 7}, {8, 9, 12, 13}, and {10, 11, 14, 15}. FIG. 3 shows a 12-port aggregation manner that is {0, 1, 2, 3}, {4, 5, 6, 7}, and {8, 9, 10, 11}.

Figure 4:
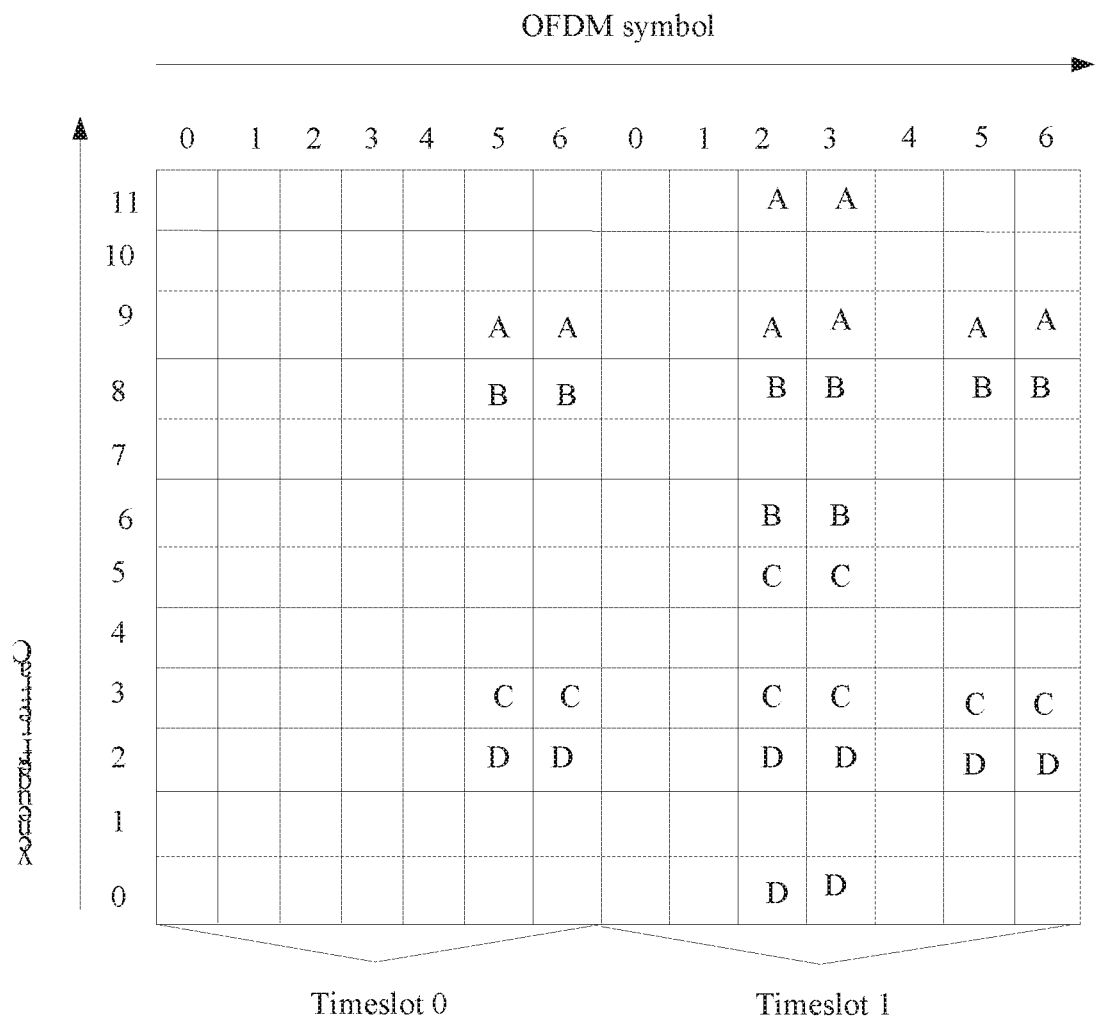
FIG. 4 is a schematic diagram of an existing CSI-RS resource design according to this application.

In 3GPP RAN 1 #85, Datang Telecom (CATT) proposed a CSI-RS resource design solution, and this solution is also supported by Ericsson (Ericsson) (R1-167634). A design manner of this solution is shown in FIG. 4. An 8-port CSI-RS for aggregating a 32-port CSI-RS is redefined, four newly-defined 8-port CSI-RSs are used to aggregate the 32-port CSI-RS, and CDM-8 is used for code division multiplexing on the newly-defined 8-port CSI-RSs, to effectively use power. Based on 32 ports, three CDMs are removed from each CDM group and not used, to obtain 20 ports. Based on 32 ports, two CDMs are removed from each CDM group and not used, to obtain 24 ports. Based on 32 ports, one CDM is removed from each CDM group and not used, to obtain 28 ports. In other words, CSI-RS resource elements occupied by the 20 ports, the 24 ports, and the 28 ports are exactly consistent with those occupied by the 32 ports.

A signal resource configuration method applied to interaction between the access network device and the terminal device in the foregoing system architecture or scenario is described below by using an embodiment.

Figure 5:
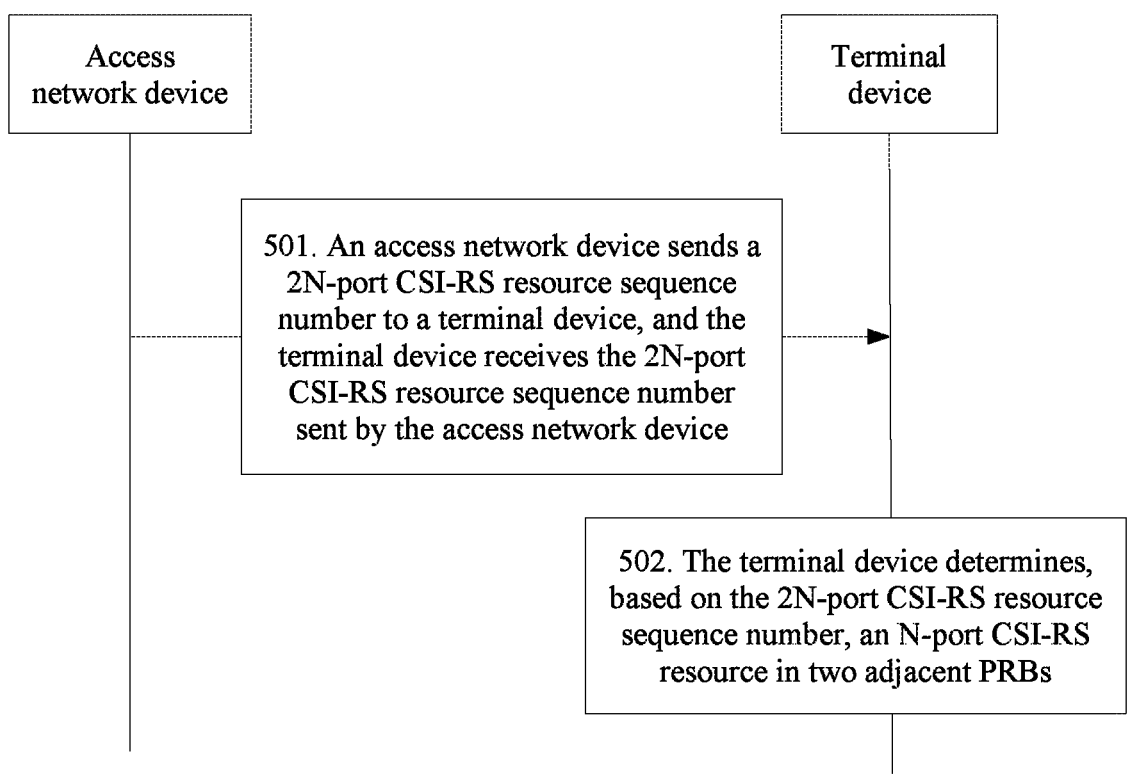
FIG. 5 is a signaling flowchart of an embodiment of a signal resource configuration method according to this application.

Referring to FIG. 5, an embodiment of the present invention provides a signal resource configuration method, and the method includes the following steps.

501. An access network device sends a 2N-port CSI-RS resource sequence number to a terminal device, and the terminal device receives the 2N-port CSI-RS resource sequence number sent by the access network device.

In this embodiment, the 2N-port CSI-RS resource sequence number sent by the access network device is used to notify the terminal device of an N-port CSI-RS resource in two adjacent PRBs, and N is a positive integer. For example a PRB 1 is adjacent to a PRB 2, and a 4-port CSI-RS sub-resource in the PRB 1 and a 4-port CSI-RS sub-resource in the PRB 2 are to be notified. A problem that needs to be resolved based on this solution is a problem of an 8-port CSI-RS resource, and therefore, N is equal to 4. An application scenario may be a case of a 4(2K+1)-port CSI-RS resource. When K is 2, there are 20 ports; when K is 3, there are 28 ports. These are all scenarios having disadvantages in the prior art. Specifically, in actual application, there may be a scenario in which there are more ports. Therefore, that N=4 and K=2 or 3 is applied only to this embodiment. A specific value is not limited. The terminal device receives the 2N-port CSI-RS resource sequence number sent by the access network device. The 2N-port CSI-RS resource sequence number may be defined in the following manner: For a scenario of 20 ports shown in FIG. 8, an 8-port CSI-RS resource sequence number can be obtained by using an existing 4-port CSI-RS resource sequence number, as shown in Table 1.

TABLE 1

| CSI-RS configuration sequence number | CSI-RS resource configuration manners for different port quantities | | | | | | | | | | | |
|---|---|---|---|---|---|---|---|---|---|---|---|---|
| | 1 or 2 | | | | 4 | | | | 8 | | | |
| | Normal subframe | | Special subframe | | Normal subframe | | Special subframe | | Normal subframe | | Special subframe | |
| 0 | (9, 5) | 0 | (9, 5) | 0 | (9, 5) | 0 | (9, 5) | 0 | (9, 5) | 0 | (9, 5) | 0 |
| 1 | (11, 2) | 1 | (11, 5) | 0 | (11, 2) | 1 | (11, 5) | 0 | (11, 2) | 1 | (11, 5) | 0 |
| 2 | (9, 2) | 1 | (9, 2) | 1 | (9, 2) | 1 | (9, 2) | 1 | (9, 2) | 1 | (9, 2) | 1 |
| 3 | (7, 2) | 1 | (7, 5) | 0 | (7, 2) | 1 | (7, 5) | 0 | (7, 2) | 1 | (7, 5) | 0 |
| 4 | (9, 5) | 1 | | | (9, 5) | 1 | | | (9, 5) | 1 | | |
| 5 | (8, 5) | 0 | (8, 5) | 0 | (8, 5) | 0 | (8, 5) | 0 | | | | |
| 6 | (10, 2) | 1 | (10, 5) | 0 | (10, 2) | 1 | (10, 5) | 0 | | | | |
| 7 | (8, 2) | 1 | (8, 2) | 1 | (8, 2) | 1 | (8, 2) | 1 | | | | |
| 8 | (6, 2) | 1 | (6, 5) | 0 | (6, 2) | 1 | (6, 5) | 0 | | | | |
| 9 | (8, 5) | 1 | | | (8, 5) | 1 | | | | | | |
| 10 | (3, 5) | 0 | (3, 5) | 0 | | | | | (9, 5) | 0 | (9, 5) | 0 |
| 11 | (2, 5) | 0 | (2, 5) | 0 | | | | | (11, 2) | 1 | (11, 5) | 0 |
| 12 | (5, 2) | 1 | (5, 5) | 0 | | | | | (9, 2) | 1 | (9, 2) | 1 |
| 13 | (4, 2) | 1 | (4, 5) | 0 | | | | | (7, 2) | 1 | (7, 5) | 0 |
| 14 | (3, 2) | 1 | (3, 2) | 1 | | | | | (9, 5) | 1 | | |
| 15 | (2, 2) | 1 | (2, 2) | 1 | | | | | (8, 5) | 0 | (8, 5) | 0 |
| 16 | (1, 2) | 1 | (1, 5) | 0 | | | | | (10, 2) | 1 | (10, 5) | 0 |
| 17 | (0, 2) | 1 | (0, 5) | 0 | | | | | (8, 2) | 1 | (8, 2) | 1 |
| 18 | (3, 5) | 1 | | | | | | | (6, 2) | 1 | (6, 5) | 0 |
| 19 | (2, 5) | 1 | | | | | | | (8, 5) | 1 | | |
| 20 | (11, 1) | 1 | | | (11, 1) | 1 | | | (11, 1) | 1 | | |
| 21 | (9, 1) | 1 | | | (9, 1) | 1 | | | (9, 1) | 1 | | |
| 22 | (7, 1) | 1 | | | (7, 1) | 1 | | | (7, 1) | 1 | | |
| 23 | (10, 1) | 1 | | | (10, 1) | 1 | | | | | | |
| 24 | (8, 1) | 1 | | | (8, 1) | 1 | | | | | | |
| 25 | (6, 1) | 1 | | | (6, 1) | 1 | | | | | | |
| 26 | (5, 1) | 1 | | | | | | | (11, 1) | 1 | | |

TABLE 1-continued

| CSI-RS | CSI-RS resource configuration manners for different port quantities | | | | | |
|---|---|---|---|---|---|---|
| configuration | 1 or 2 | | 4 | | 8 | |
| sequence number | Normal subframe | Special subframe | Normal subframe | Special subframe | Normal subframe | Special subframe |
| 27 | (4, 1) | 1 | | | (9, 1) | 1 |
| 28 | (3, 1) | 1 | | | (7, 1) | 1 |
| 29 | (2, 1) | 1 | | | (10, 1) | 1 |
| 30 | (1, 1) | 1 | | | (8, 1) | 1 |
| 31 | (0, 1) | 1 | | | (6, 1) | 1 |

It can be learned from Table 1 that for configurations of 8-port CSI-RS resource sequence numbers, configurations of 4-port CSI-RS resource sequence numbers 0 to 9 are reused for resource sequence numbers 10 to 19, and similarly, 4-port CSI-RS resource sequence numbers 20 to 25 are reused for resource sequence numbers 26 to 31. Because these 8-port CSI-RS resource sequence numbers are not defined, adding such a definition herein has little impact on a standard. The 2N-port CSI-RS resource sequence number may be sent in a semi-static manner, for example, by using a Radio Resource Control (Radio Resource Control, RRC) protocol, or may be sent dynamically, for example, by using downlink control information (Downlink Control Information, DCI). The terminal device may obtain the 2N-port CSI-RS resource sequence number by using RRC signaling or the DCI.

502. The terminal device determines, based on the 2N-port CSI-RS resource sequence number, an N-port CSI-RS resource in two adjacent PRBs.

In this embodiment, after receiving the 2N-port CSI-RS resource sequence number, because the 2N-port CSI-RS resource sequence number explicitly indicates the N-port CSI-RS resource in the two adjacent PRBs, the terminal device may determine, based on the 2N-port CSI-RS resource sequence number, the N-port CSI-RS resource in the two adjacent PRBs, so that the terminal device can receive a reference signal sent by the access network device on the N-port CSI-RS resource in the two adjacent PRBs.

In this embodiment of the present invention, the 2N-port CSI-RS resource is obtained by aggregating N-port CSI-RS sub-resources in different PRBs. Therefore, in the prior art, when CSI-RS resources of 24 and 32 ports are obtained by aggregating 8-port CSI-RS resources, CSI-RS resources of 20 and 28 ports can also be configured by using a plurality of 8-port resource sequence numbers, so as to reduce signaling overheads, and cause less impact on an existing standard. However, in comparison with the prior art, in a case of 20 ports, during a CDM-8 configuration, there is no need to remove three CDMs from each CDM group; and in a case of 28 ports, there is no need to remove one CDM from each CDM group. Therefore, in this solution, in a case of 4(2K+1) ports, for example, 20 ports or 28 ports, there is no waste of resources.

Optionally, in some embodiments of the present invention, the 2N-port CSI-RS resource sequence number is used to indicate a 2N-port CSI-RS resource in two different PRBs.

The 2N-port CSI-RS resource is a first N-port CSI-RS sub-resource in a first PRB and a second N-port CSI-RS sub-resource in a second PRB; or the 2N-port CSI-RS resource is a half of a first 2N-port CSI-RS sub-resource in a first PRB and a half of a second 2N-port CSI-RS sub-resource in a second PRB.

Figure 6:
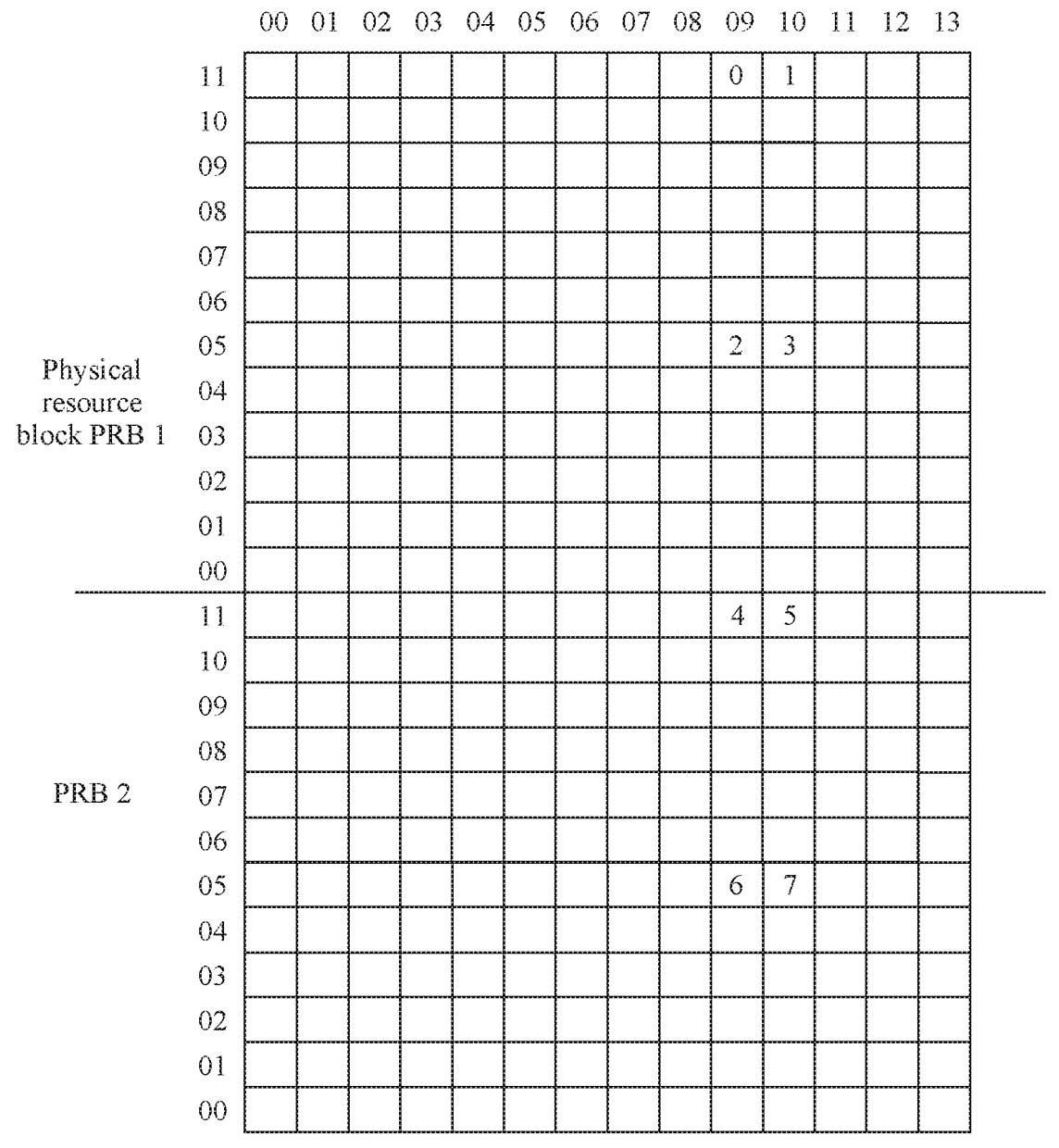
Figure 7:
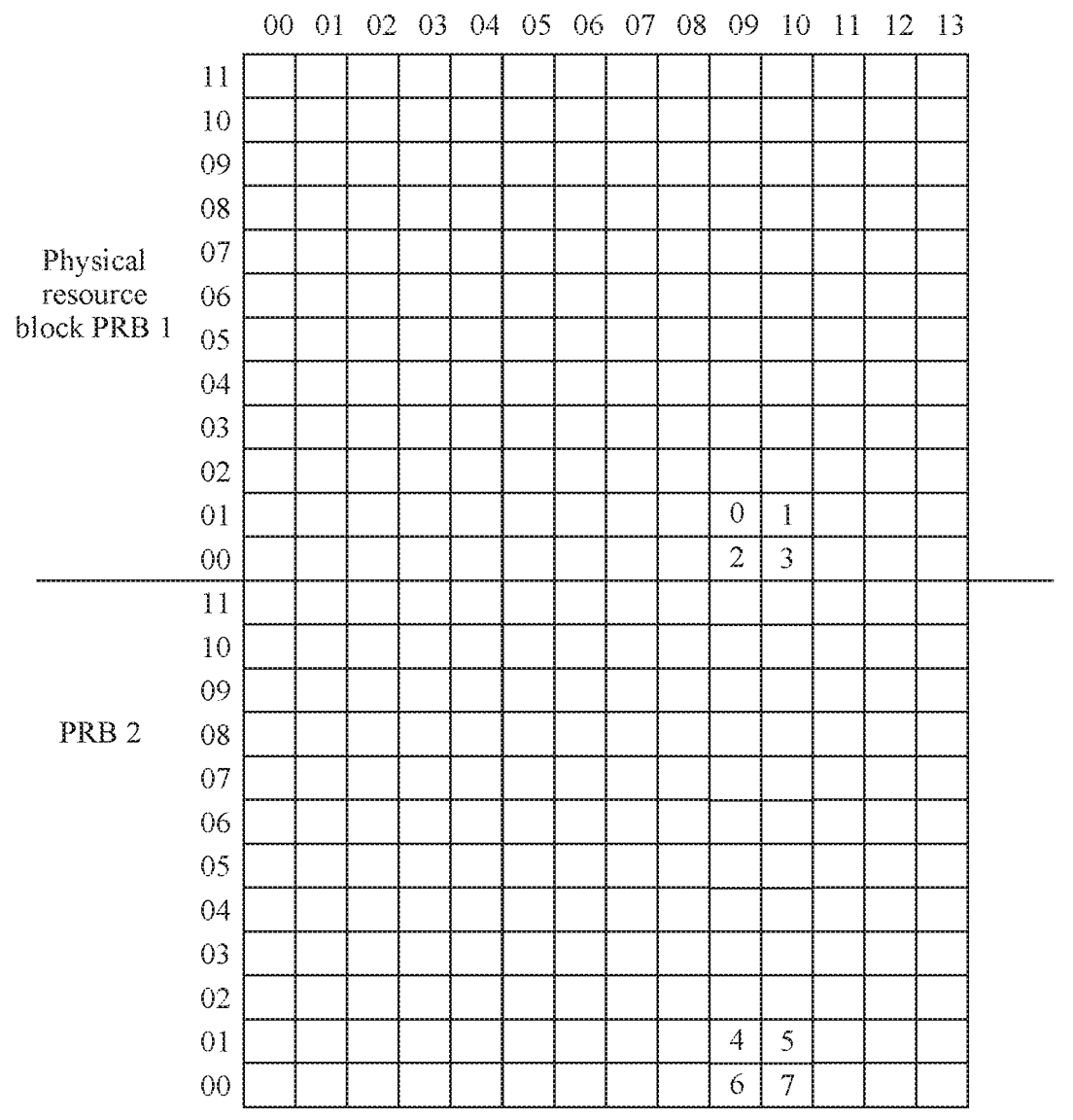
Figure 8:
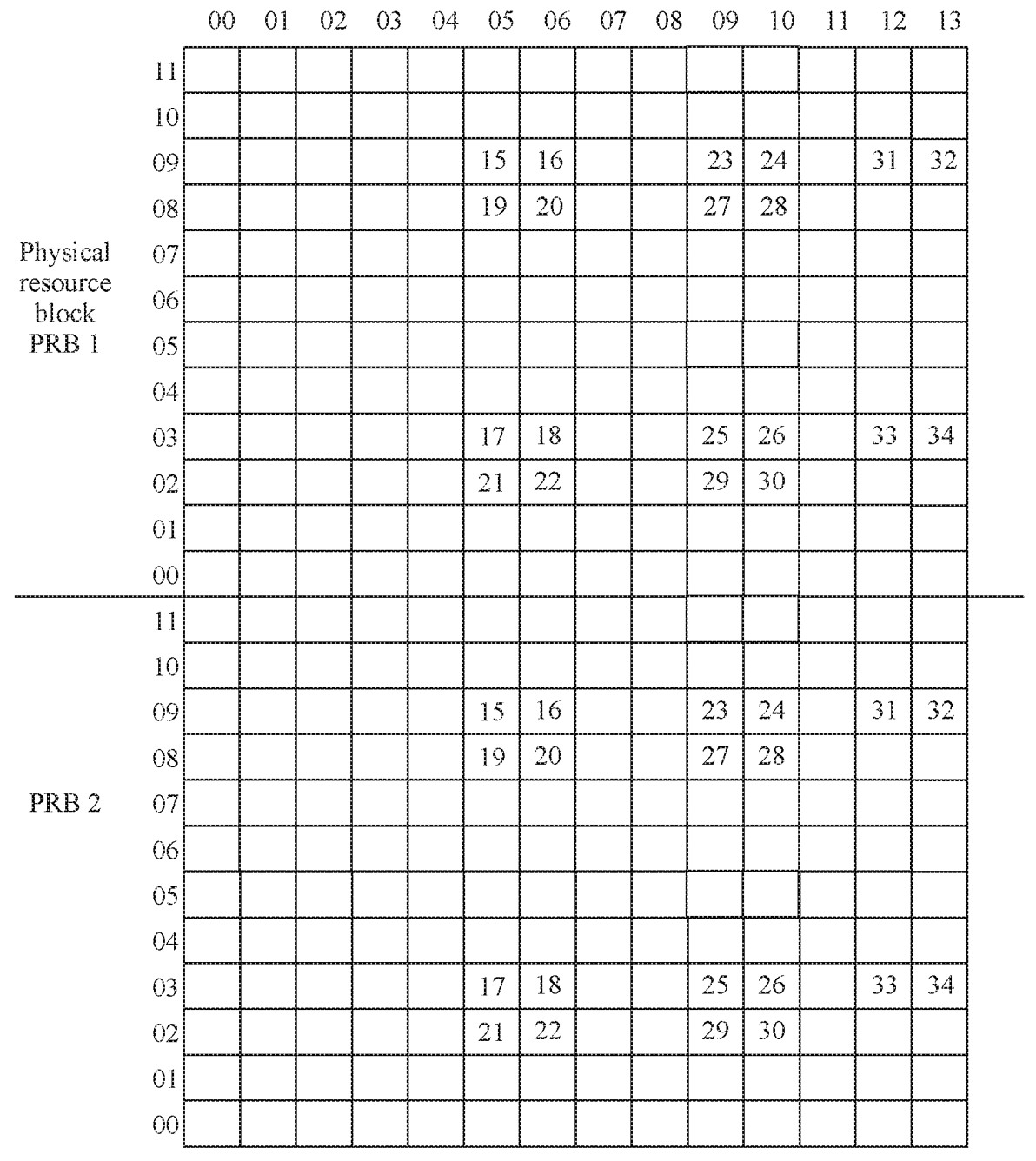

In this embodiment of the present invention, it is assumed that the N-port CSI-RS sub-resources in the two PRB are 4-port CSI-RS sub-resources. FIG. 6 is used as an example. A first 4-port CSI-RS sub-resource in the first PRB (PRB 1) and a second 4-port CSI-RS sub-resource in the second PRB (PRB 2) are aggregated to obtain an 8-port CSI-RS resource; {0, 1} in the first 4-port CSI-RS sub-resource and {4, 5} in the second 4-port CSI-RS sub-resource have a same time-frequency domain location; and {2, 3} in the first 4-port CSI-RS sub-resource and {6, 7} in the second 4-port CSI-RS sub-resource have a same time-frequency domain location. FIG. 7 is used as an example. In the example, {0, 1, 2, 3} that is a half of a first 8-port CSI-RS sub-resource in the first PRB (PRB 1) and {4, 5, 6, 7} that is a half of a second 8-port CSI-RS sub-resource in the second PRB (PRB 2) are aggregated to obtain an 8-port CSI-RS resource; and {0, 1, 2, 3} that is the half of the first 8-port CSI-RS sub-resource and {4, 5, 6, 7} that is the half of the second 8-port CSI-RS sub-resource have a same time-frequency domain location. CSI-RS resources in the scenario of 20 ports are shown in FIG. 8. For a 20-port CSI-RS resource, a 4-port CSI-RS sub-resource {31, 32} and {33, 34} in the PRB 1 and a 4-port CSI-RS sub-resource {31, 32} and {33, 34} in the PRB 2 are aggregated to form an 8-port CSI-RS resource. CSI-RS resources in a scenario of 28 ports are shown in FIG. 9. {37, 38, 39, 40} that is a half of an 8-port CSI-RS sub-resource in the PRB 1 and {37, 38, 39, 40} that is a half of an 8-port CSI-RS sub-resource in the PRB 2 are aggregated to form an 8-port CSI-RS resource. It should be noted that in FIG. 9. {31, 32, 35, 36} that is a remaining half of the 8-port CSI-RS sub-resource in the PRB 1 and {31, 32, 35, 36} that is a remaining half of the 8-port CSI-RS sub-resource in the PRB 2 cannot be used for data transmission of a terminal of an earlier release of LTE, but can be used for data transmission of a terminal of a subsequent release of LTE, or may be used as aperiodic CSI-RS resources of a terminal of a subsequent release or reused by another cell.

Based on the foregoing embodiment, the access network device can configure a plurality of 2N-port CSI-RS resources to obtain a 4(2K+1)-port CSI-RS resource through aggregation.

Optionally, in some embodiments of the present invention, the signal resource configuration method further includes:

configuring, by the access network device, a plurality of 2N-port CSI-RS resources to obtain a 4(2K+1)-port CSI-RS resource, where the plurality of 2N-port CSI-RS resources include a first CSI-RS resource and a second CSI-RS resource, the first CSI-RS resource is a 2N-port CSI-RS resource in a same PRB, the second CSI-RS resource is a 2N-port CSI-RS resource in two different PRBs, and K is a positive integer; and sending, by the access network device, resource sequence numbers of the plurality of 2N-port CSI-RS resources to the terminal device.

In this embodiment of the present invention, the access network device configures the plurality of 2N-port CSI-RS resources to obtain the 4(2K+1)-port CSI-RS resource. The 2N-port CSI-RS resources include the first CSI-RS resource and the second CSI-RS resource. The first CSI-RS resource is a 2N-port CSI-RS resource in a same PRB, and the second CSI-RS resource is a 2N-port CSI-RS resource in two different PRBs. As shown in FIG. 8, {15, 16, 19, 20} and {17, 18, 21, 22} in the PRB 1, {23, 24, 27, 28} and {25, 26, 29, 30} in the PRB 1, {15, 16, 19, 20} and {17, 18, 21, 22} in the PRB 2, and {23, 24, 27, 28} and {25, 26, 29, 30} in the PRB 2 are first CSI-RS resources; {31, 32} and {33, 34} in the PRB 1 and {31, 32} and {33, 34} in the PRB 2 are second CSI-RS resources. After obtaining the 4(2K+1)-port CSI-RS resource, the access network device sends the resource sequence numbers of the plurality of 2N-port CSI-RS resources to the terminal device, so that the terminal device can determine the 4(2K+1)-port CSI-RS resource based on the resource sequence numbers of the plurality of 2N-port CSI-RS resources.

In the foregoing embodiment, 4(2K+1) ports need to be numbered in a process in which the access network device configures the 2N-port CSI-RS resources to obtain the 4(2K+1)-port CSI-RS resource. This is specifically refined below by using implementation, and a CDM configuration performed on the 4(2K+1)-port CSI-RS resource is also described below. Details are as follows.

Figure 10:
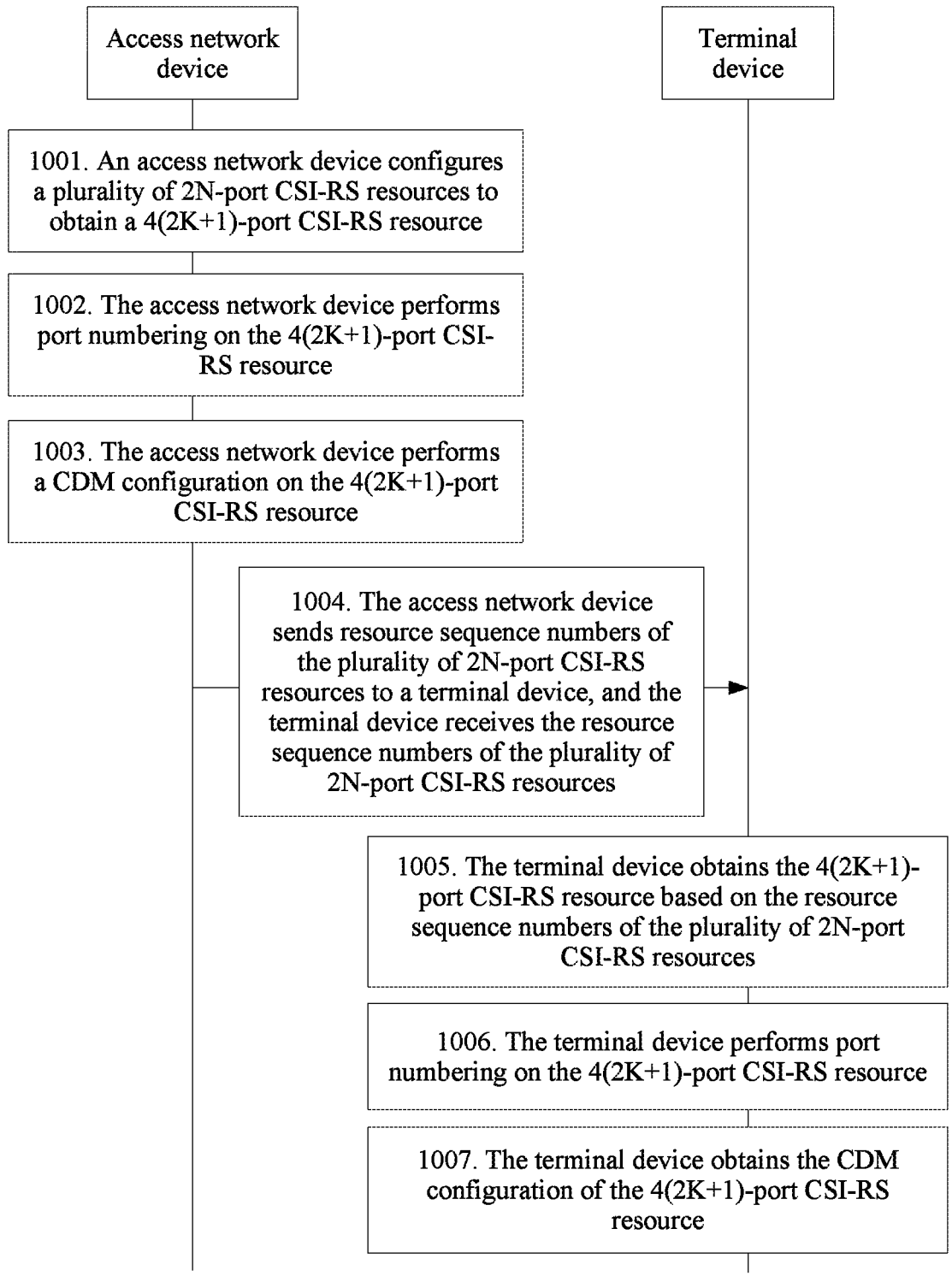
FIG. 10 is a signaling flowchart of another embodiment of a signal resource configuration method according to this application.

Referring to FIG. 10, an embodiment of the present invention provides a signal resource configuration method, and the method includes the following steps.

1001. An access network device configures a plurality of 2N-port CSI-RS resources to obtain a 4(2K+1)-port CSI-RS resource.

In this embodiment, before sending a 2N-port CSI-RS resource sequence number, the access network device needs to configure the 2N-port CSI-RS resources to obtain the 4(2K+1)-port CSI-RS resource through aggregation. The 2N-port CSI-RS resources include a first CSI-RS resource and a second CSI-RS resource, and the first CSI-RS resource is a 2N-port CSI-RS resource in a same PRB. A first implementation is shown in FIG. 8. For a 20-port CSI-RS resource, a 4-port CSI-RS resource {31, 32} and {33, 34} in a PRB 1 and a 4-port CSI-RS resource {31, 32} and {33, 34} in a PRB 2 are aggregated to form an 8-port CSI-RS resource. The second CSI-RS resource is a 2N-port CSI-RS resource in two different PRBs, and K is a positive integer.

1002. The access network device performs port numbering on the 4(2K+1)-port CSI-RS resource.

In this embodiment, that the access network device performs port numbering on the 4(2K+1)-port CSI-RS resource is specifically as follows: The access network device first numbers a port corresponding to the first CSI-RS resource, and then numbers a port corresponding to the second CSI-RS resource. A numbering result is shown in FIG. 8, and {31, 32} and {33, 34} in the PRB 1 and {31, 32} and {33, 34} in the PRB 2 are second CSI-RS resources.

1003. The access network device performs a CDM configuration on the 4(2K+1)-port CSI-RS resource.

Figure 11:
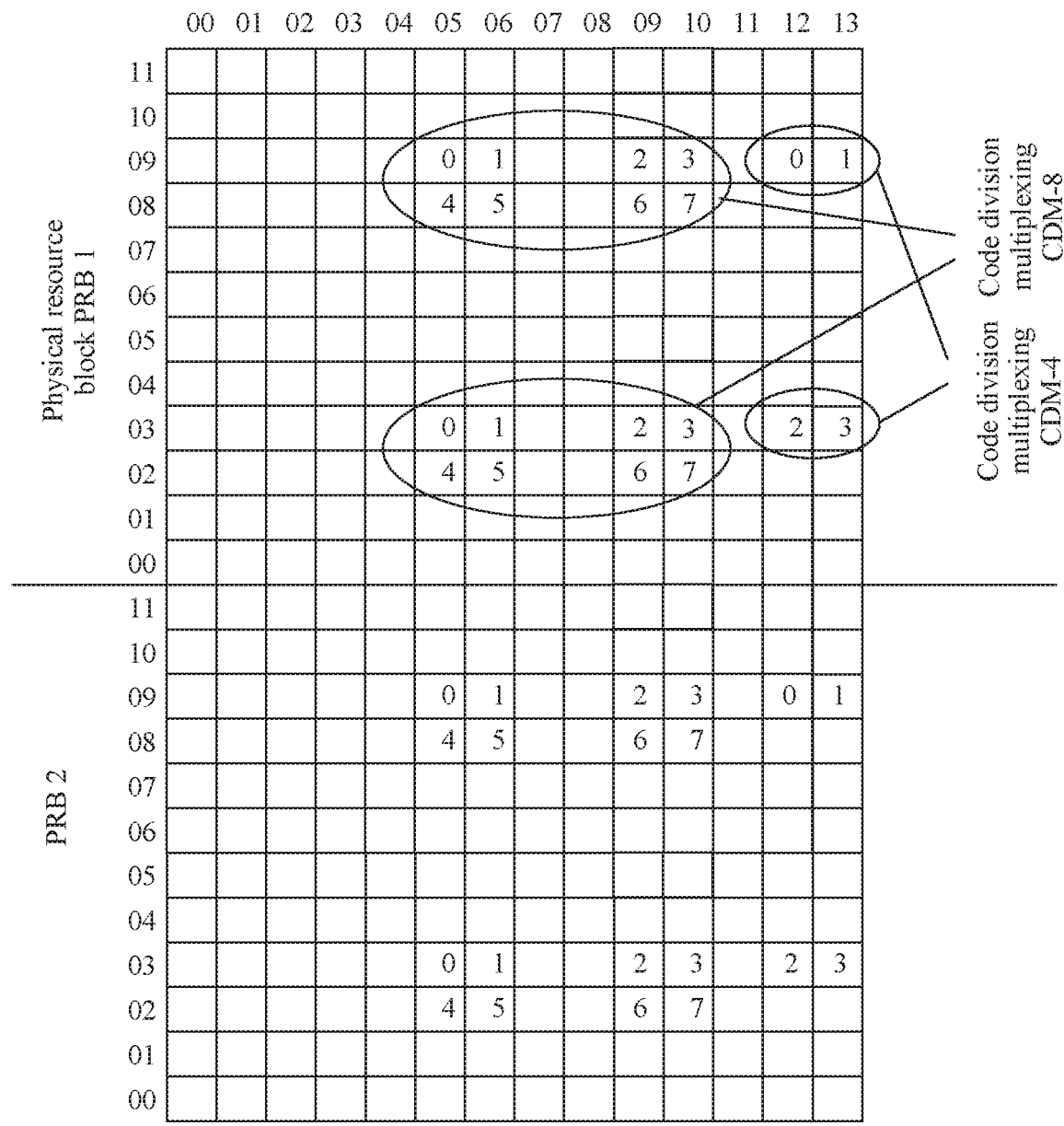
FIG. 11 is a schematic diagram of a CDM-8 configuration of an 8-port CSI-RS resource for 20 ports according to this application.

In this embodiment, before sending the 2N-port CSI-RS resource sequence number, the access network device needs to perform the CDM configuration on the 4(2K+1)-port CSI-RS resource by using a CDM technology. A specific process is as follows: CDM-8 is configured for the first CSI-RS resource, that is, CDM-8 is configured for an 8-port CSI-RS resource in a same PRB. CDM-4 is configured for the second CSI-RS resource. To be specific, one half of the 8-port CSI-RS resource is in the PRB 1 and the other half is in the PRB 2, CDM-4 is configured and power is amplified by 3 dB for the half in the PRB 1, and same processing is performed on the half in the PRB 2. As shown in FIG. 11. CDM-8 is configured for two 8-port CSI-RS resources {{0, 1, 4, 5}, {2, 3, 6, 7}} in the PRB 1; and CDM-4 is configured for a half of the second CSI-RS resource, that is, {{0, 1}, {2, 3}}, and a 3 dB power increase is introduced, thereby ensuring consistent power on all ports. In addition, to ensure channel state consistency between resource elements (RE) crossed by CDM, a frequency domain span needs to be reduced as much as possible, and a maximum interval does not exceed six subcarriers (that is, six REs). Although CDM is configured by the access network device, a specific 2N-CDM configuration manner is preset, and the specific 2N-CDM configuration manner is known to both the access network device and the terminal device.

1004. The access network device sends resource sequence numbers of the plurality of 2N-port CSI-RS resources to a terminal device, and the terminal device receives the resource sequence numbers of the plurality of 2N-port CSI-RS resources.

In this embodiment, after obtaining the 4(2K+1)-port CSI-RS resource, the access network device sends the resource sequence numbers of the plurality of 2N-port CSI-RS resources to the terminal device, so that the terminal device can determine the 4(2K+1)-port CSI-RS resource based on the resource sequence numbers of the plurality of 2N-port CSI-RS resources.

1005. The terminal device obtains the 4(2K+1)-port CSI-RS resource based on the resource sequence numbers of the plurality of 2N-port CSI-RS resources.

In this embodiment, the terminal device can determine the 4(2K+1)-port CSI-RS resource based on the resource sequence numbers of the plurality of 2N-port CSI-RS resources.

1006. The terminal device performs port numbering on the 4(2K+1)-port CSI-RS resource.

In this embodiment, that the terminal device performs port numbering on the obtained 4(2K+1)-port CSI-RS resource is specifically as follows: The terminal device first numbers the port corresponding to the first CSI-RS resource, and then numbers the port corresponding to the second CSI-RS resource. In addition, a numbering rule is preset and known to both the access network device and the terminal device. In this case, before receiving the 2N-port CSI-RS resource sequence number, the terminal device numbers the port corresponding to the first CSI-RS resource and numbers the port corresponding to the second CSI-RS resource.

1007. The terminal device obtains the CDM configuration of the 4(2K+1)-port CSI-RS resource.

In this embodiment, because a CDM configuration manner is known to both the access network device and the terminal device, the CDM configuration of the 4(2K+1)-port CSI-RS resource includes a 2N-CDM manner used for the first CSI-RS resource and an N-CDM manner used for the second CSI-RS resource.

In this embodiment, after receiving the 2N-port CSI-RS resource sequence number, because the 2N-port CSI-RS resource sequence number explicitly indicates an N-port CSI-RS resource in two adjacent PRBs, the terminal device may determine, based on the 2N-port CSI-RS resource sequence number, the N-port CSI-RS resource in the two adjacent PRBs, so that the terminal device can receive information sent by the access network device on the N-port CSI-RS resource in the two adjacent PRBs.

It should be noted that in the foregoing embodiment, the 2N-port CSI-RS resources are configured according to the preset numbering rule to obtain the 4(2K+1)-port CSI-RS resource, and the specific 2N-CDM configuration manner in which the CDM configuration is performed on the 4(2K+1)-port CSI-RS resource is also preset and known to both the access network device and the terminal device. In this way, signaling overheads can be reduced. However, in addition to using a preset rule, the access network device may notify the terminal device of the 4(2K+1)-port CSI-RS resource by using configuration information after obtaining the 4(2K+1)-port CSI-RS resource.

The signal resource configuration method is described in the foregoing embodiment. An access network device and a terminal device are separately described in the following embodiments.

Figure 12:
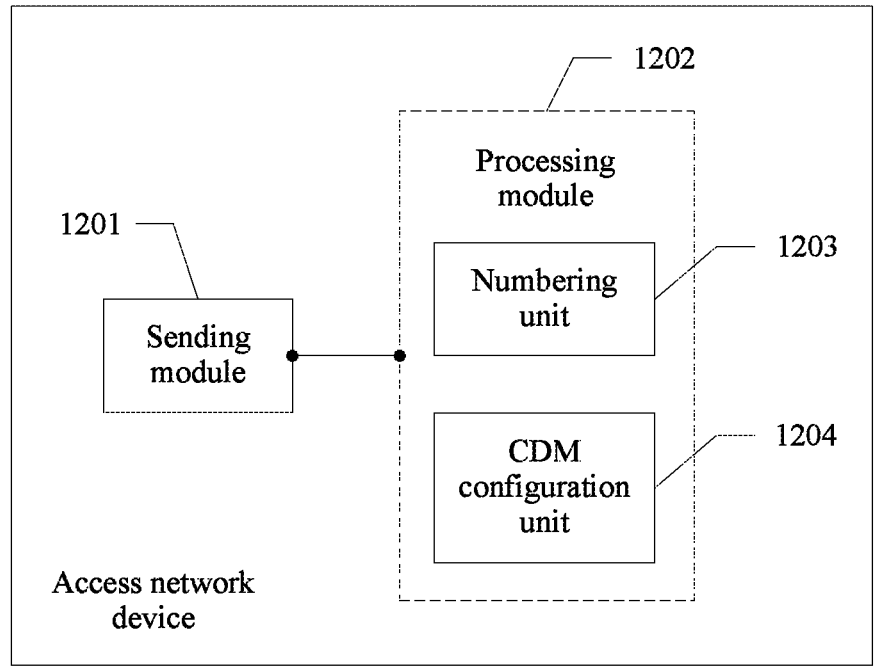
FIG. 12 is a schematic structural diagram of an embodiment of an access network device according to this application.

Referring to FIG. 12, an embodiment of the present invention provides an access network device, and the access network device includes:

a sending module 1201, configured to send a 2N-port channel measurement pilot signal CSI-RS resource sequence number to a terminal device, where the 2N-port CSI-RS resource sequence number is used to notify the terminal device of an N-port CSI-RS resource in two adjacent physical resource blocks PRBs. and N is a positive integer.

In this embodiment of the present invention, the sending module 1201 sends the 2N-port CSI-RS resource sequence number to the terminal device, so that the terminal device can determine the N-port CSI-RS resource in the two adjacent PRBs. A 2N-port CSI-RS resource is obtained by aggregating N-port CSI-RS sub-resources in different PRBs. Therefore, in the prior art, when CSI-RS resources of 24 and 32 ports are obtained by aggregating 8-port CSI-RS resources, CSI-RS resources of 20 and 28 ports can also be configured by using a plurality of 8-port resource sequence numbers, so as to reduce signaling overheads, and cause less impact on an existing standard. However, in comparison with the prior art, in a case of 20 ports, during a CDM-8 configuration, there is no need to remove three CDMs from each CDM group; and in a case of 28 ports, there is no need to remove one CDM from each CDM group. Therefore, in this solution, in a case of 4(2K+1) ports, for example, 20 ports or 28 ports, there is no waste of resources.

Optionally, in some embodiments of the present invention,
the 2N-port CSI-RS resource sequence number is used to indicate a 2N-port CSI-RS resource in two different PRBs.

The 2N-port CSI-RS resource is a first N-port CSI-RS sub-resource in a first PRB and a second N-port CSI-RS sub-resource in a second PRB; or the 2N-port CSI-RS resource is a half of a first 2N-port CSI-RS sub-resource in a first PRB and a half of a second 2N-port CSI-RS sub-resource in a second PRB.

Optionally, in some embodiments of the present invention, the access network device further includes:

a processing module 1202, configured to configure a plurality of 2N-port CSI-RS resources to obtain a 4(2K+1)-port CSI-RS resource, where the plurality of 2N-port CSI-RS resources include a first CSI-RS resource and a second CSI-RS resource, the first CSI-RS resource is a 2N-port CSI-RS resource in a same PRB, the second CSI-RS resource is a 2N-port CSI-RS resource in two different PRBs, and K is a positive integer.

The sending module 1201 is further configured to send resource sequence numbers of the plurality of 2N-port CSI-RS resources to the terminal device.

In this embodiment of the present invention, before the sending module 1201 sends the 2N-port CSI-RS resource sequence number, the processing module 1202 needs to configure the plurality of 2N-port CSI-RS resources to obtain the 4(2K+1)-port CSI-RS resource. The N-port CSI-RS resources include the first CSI-RS resource and the second CSI-RS resource. The first CSI-RS resource is a 2N-port CSI-RS resource in a same PRB, the second CSI-RS resource is a 2N-port CSI-RS resource in two different PRBs. and K is a positive integer.

Optionally, in some embodiments of the present invention,
the processing module 1202 is further configured to perform port numbering on the 4(2K+1)-port CSI-RS resource.

The processing module 1202 includes:
a numbering unit 1203, configured to number a port corresponding to the first CSI-RS resource.

The numbering unit 1203 is further configured to number a port corresponding to the second CSI-RS resource.

In this embodiment of the present invention, according to a preset numbering rule, the numbering unit 1203 in the processing module 1202 needs to preferentially number a port corresponding to a 2N-port CSI-RS resource (that is, the first CSI-RS resource) in a same PRB, and then number a port corresponding to a 2N-port CSI-RS resource (that is, the second CSI-RS resource) in two different PRBs. Advantages of this lie in that better forward compatibility can be ensured, and the preset numbering rule is known to both the access network device and the terminal device.

Optionally, in some embodiments of the present invention,
the processing module 1202 is further configured to perform a CDM configuration on the 4(2K+1)-port CSI-RS resource.

The processing module 1202 includes:
a CDM configuration unit 1204, configured to configure 2N-CDM for the first CSI-RS resource.

The CDM configuration unit 1204 is further configured to: configure N-CDM for the second CSI-RS resource, and increase transmit power by 3 dB for the second CSI-RS resource.

In this embodiment of the present invention, the CDM configuration unit 1204 in the processing module 1202 configures 2N-CDM for the 2N-port CSI-RS resource on the first CSI-RS resource. However, for the second CSI-RS resource that is a 2N-port CSI-RS resource in two different PRBs, the CDM configuration unit 1204 can configure N-CDM for the 2N-port CSI-RS resource and amplify power by 3 dB. This can ensure consistent power on all ports. In addition, to ensure channel state consistency between resource elements (RE) crossed by CDM, a frequency domain span needs to be reduced as much as possible, and a maximum interval does not exceed six subcarriers (that is, six REs).

Figure 13:
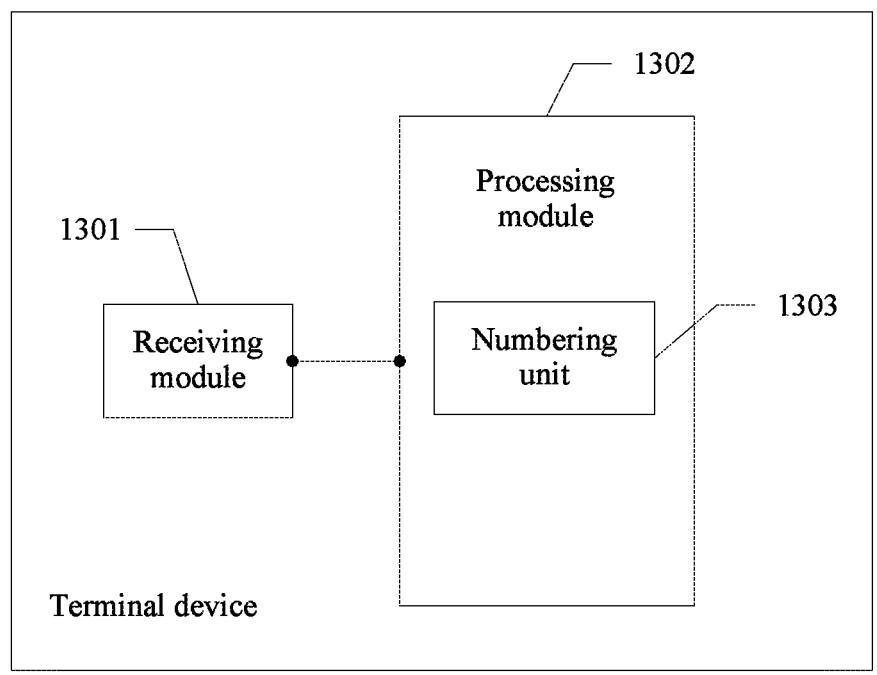
FIG. 13 is a schematic structural diagram of an embodiment of a terminal device according to this application.

Referring to FIG. 13, an embodiment of the present invention provides a terminal device, and the terminal device includes:

a receiving module 1301, configured to receive a 2N-port CSI-RS resource sequence number sent by an access network device; and a processing module 1302, configured to determine, based on the 2N-port CSI-RS resource sequence number, an N-port CSI-RS resource in two adjacent PRBs, where N is a positive integer.

In this embodiment of the present invention, the receiving module 1301 receives a resource sequence number and 2N-port configuration information sent by the access network device. The resource sequence number is used to indicate a 2N-port channel measurement pilot signal CSI-RS resource, and the 2N-port configuration information is used to indicate a CDM configuration of a 2N-port CSI-RS resource. The 2N-port CSI-RS resource is obtained by aggregating two N-port CSI-RS sub-resources in different PRBs, and the processing module 1302 determines a 2N-port CSI-RS configuration. The 2N-port CSI-RS resource is obtained by aggregating N-port CSI-RS resources in different PRBs. Therefore, in the prior art, when CSI-RS resources of 24 and 32 ports are obtained by aggregating 8-port CSI-RS resources, CSI-RS resources of 20 and 28 ports can also be configured by using a plurality of 8-port resource sequence numbers, so as to reduce signaling overheads, and cause less impact on an existing standard. However, in comparison with the prior art, in a case of 20 ports, during a CDM-8 configuration, there is no need to remove three CDMs from each CDM group; and in a case of 28 ports, there is no need to remove one CDM from each CDM group. Therefore, in this solution, in a case of 4(2N+1) ports, for example, 20 ports or 28 ports, there is no waste of resources.

Optionally, in some embodiments of the present invention, the 2N-port CSI-RS resource sequence number is used to indicate a 2N-port CSI-RS resource in two different PRBs.

The 2N-port CSI-RS resource is a first N-port CSI-RS sub-resource in a first PRB and a second N-port CSI-RS sub-resource in a second PRB; or the 2N-port CSI-RS resource is a half of a first 2N-port CSI-RS sub-resource in a first PRB and a half of a second 2N-port CSI-RS sub-resource in a second PRB.

Optionally, in some embodiments of the present invention, the receiving module 1301 is further configured to receive resource sequence numbers of a plurality of 2N-port CSI-RS resources; and the processing module 1302 is further configured to obtain a 4(2K+1)-port CSI-RS resource based on the resource sequence numbers of the plurality of 2N-port CSI-RS resources, where the 4(2K+1)-port CSI-RS resource is obtained by configuring the plurality of 2N-port CSI-RS resources, the plurality of 2N-port CSI-RS resources include a first CSI-RS resource and a second CSI-RS resource, the first CSI-RS resource is a 2N-port CSI-RS resource in a same PRB, the second CSI-RS resource is a 2N-port CSI-RS resource in two different PRBs, and K is a positive integer.

In this embodiment of the present invention, before sending the 2N-port CSI-RS resource sequence number, the access network device needs to configure a plurality of 2N-port CSI-RS resources to obtain a 4(2K+1)-port CSI-RS resource. Because the terminal device performs the configuration in a manner the same as the access network device, the processing module 1302 also needs to configure the plurality of 2N-port CSI-RS resources to obtain the 4(2K+1)-port CSI-RS resource. The 2N-port CSI-RS resources include the first CSI-RS resource and the second CSI-RS resource. The first CSI-RS resource is a 2N-port CSI-RS resource in a same PRB, the second CSI-RS resource is a 2N-port CSI-RS resource in two different PRBs, and K is a positive integer.

Optionally, in some embodiments of the present invention, the processing module 1302 is further configured to perform port numbering on the 4(2K+1)-port CSI-RS resource.

The processing module 1302 includes:

a numbering unit 1303, configured to number a port corresponding to the first CSI-RS resource.

The numbering unit 1303 is further configured to number a port corresponding to the second CSI-RS resource.

In this embodiment of the present invention, before sending the 2N-port CSI-RS resource sequence number, the access network device configures the 2N-port CSI-RS resources according to a preset numbering rule to obtain the 4(2K+1)-port CSI-RS resource. Because the preset numbering rule is well known, according to the numbering rule, the numbering unit 1303 in the processing module 1302 preferentially numbers a port corresponding to a 2N-port CSI-RS resource (that is, the first CSI-RS resource) in a same PRB, and then numbers a port corresponding to a 2N-port CSI-RS resource (that is, the second CSI-RS resource) in two different PRBs. Advantages of this lie in that better forward compatibility can be ensured, and the preset numbering rule is known to both the access network device and the terminal device.

Optionally, in some embodiments of the present invention, the processing module 1302 is further configured to obtain a CDM configuration of the 4(2K+1)-port CSI-RS resource, where the CDM configuration of the 4(2K+1)-port CSI-RS resource includes a 2N-CDM manner used for the first CSI-RS resource and an N-CDM manner used for the second CSI-RS resource.

In this embodiment of the present invention, because the CDM configuration of the 4(2K+1)-port CSI-RS resource is sent by the access network device, and a specific manner in which the access network device performs the CDM configuration on the 4(2K+1)-port CSI-RS resource is well known, the CDM configuration of the 4(2K+1)-port CSI-RS resource is known to the processing module. The 2N-CDM manner is used for the first CSI-RS resource. However, to save CDM resources, for the second CSI-RS resource that is a 2N-port CSI-RS resource in two different PRBs, the N-CDM manner is used and power is amplified by 3 dB. This can ensure consistent power on all ports. In addition, to ensure channel state consistency between resource elements (RE) crossed by CDM, a frequency domain span needs to be reduced as much as possible, and a maximum interval does not exceed six subcarriers (that is, six REs).

In the embodiment shown in FIG. 12, a schematic structural diagram of functional modularization of the access network device is described. A schematic structural diagram of a physical apparatus of the access network device is described below.

Figure 14:
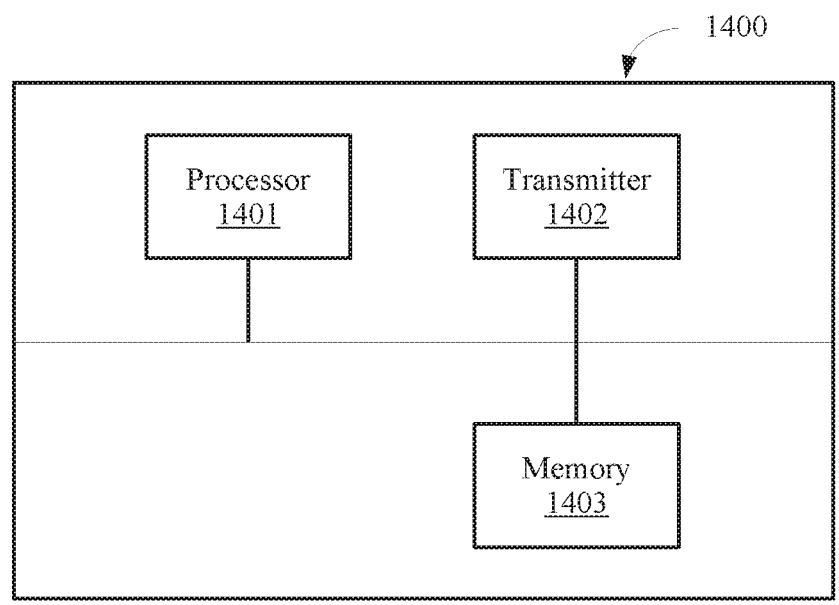
FIG. 14 is a schematic structural diagram of another embodiment of an access network device according to this application.

Referring to FIG. 14, an embodiment of the present invention provides an access network device 1400, and the access network device 1400 includes:

a processor 1401, a transmitter 1402, and a memory 1403, where the memory may be configured to store code to be executed by the processor.

The transmitter 1402 is configured to send a 2N-port CSI-RS resource sequence number to a terminal device, where the 2N-port CSI-RS resource sequence number is used to notify the terminal device of an N-port CSI-RS resource in two adjacent PRBs, and N is a positive integer.

In this embodiment of the present invention, the transmitter 1402 sends the 2N-port CSI-RS resource sequence number to the terminal device, so that the terminal device can determine the N-port CSI-RS resource in the two adjacent PRBs. A 2N-port CSI-RS resource is obtained by aggregating N-port CSI-RS sub-resources in different PRBs. Therefore, in the prior art, when CSI-RS resources of 24 and 32 ports are obtained by aggregating 8-port CSI-RS resources, CSI-RS resources of 20 and 28 ports can also be configured by using a plurality of 8-port resource sequence numbers, so as to reduce signaling overheads, and cause less impact on an existing standard. However, in comparison with the prior art, in a case of 20 ports, during a CDM-8 configuration, there is no need to remove three CDMs from each CDM group; and in a case of 28 ports, there is no need to remove one CDM from each CDM group. Therefore, in this solution, in a case of 4(2K+1) ports, for example, 20 ports or 28 ports, there is no waste of resources.

In the embodiment shown in FIG. 13, a schematic structural diagram of functional modularization of the terminal device is described. A schematic structural diagram of a physical apparatus of the terminal device is described below.

Figure 15:
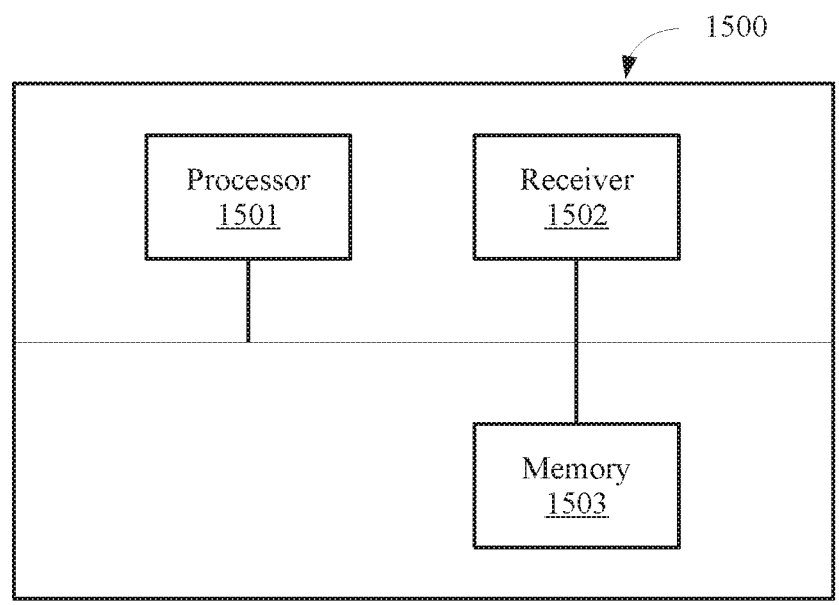
FIG. 15 is a schematic structural diagram of another embodiment of a terminal device according to this application.

Referring to FIG. 15, an embodiment of the present invention provides a terminal device 1500, and the terminal device 1500 includes:

a processor 1501, a receiver 1502, and a memory 1503, where the memory 1503 may be configured to store code to be executed by the processor 1501.

The receiver 1502 is configured to receive a 2N-port CSI-RS resource sequence number sent by an access network device.

The processor 1501 is configured to determine, based on the 2N-port CSI-RS resource sequence number, an N-port CSI-RS resource in two adjacent PRBs, where N is a positive integer.

In this embodiment of the present invention, the receiver 1502 receives a resource sequence number and 2N-port configuration information sent by the access network device. The resource sequence number is used to indicate a 2N-port channel measurement pilot signal CSI-RS resource, and the 2N-port configuration information is used to indicate a code division multiplexing CDM configuration of a 2N-port CSI-RS resource. The N-port CSI-RS resource is obtained by aggregating two N-port CSI-RS resources in different physical resource blocks PRBs, and the processor 1501 determines a 2N-port CSI-RS configuration. The 2N-port CSI-RS resource is obtained by aggregating N-port CSI-RS sub-resources in different PRBs. Therefore, in the prior art, when CSI-RS resources of 24 and 32 ports are obtained by aggregating 8-port CSI-RS resources, CSI-RS resources of 20 and 28 ports can also be configured by using a plurality of 8-port resource sequence numbers, so as to reduce signaling overheads, and cause less impact on an existing standard. However, in comparison with the prior art, in a case of 20 ports, during a CDM-8 configuration, there is no need to remove three CDMs from each CDM group: and in a case of 28 ports, there is no need to remove one CDM from each CDM group. Therefore, in this solution, in a case of 4(2N+1) ports, for example, 20 ports or 28 ports, there is no waste of resources.

It should be noted that for ease of description, the foregoing method embodiments are described as a series of action combinations. However, a person skilled in the art should understand that the present invention is not limited to the described sequence of the actions, because some steps may be performed in another sequence or performed at the same time according to the present invention. In addition, a person skilled in the art should also appreciate that all the embodiments described in the specification are example embodiments, and the related actions and modules are not necessarily mandatory to the present invention.

A person of ordinary skill in the art may understand that all or some of the steps of the methods in the embodiments may be implemented by a program instructing related hardware. The program may be stored in a computer readable storage medium. The storage medium may include: a ROM, a RAM, a magnetic disk, an optical disc, or the like.

The data transmission method, access network device, and user equipment provided in the embodiments of the present invention are described in detail above. The principle and implementation of the present invention are described herein through specific examples. The description about the embodiments is merely provided to help understand the method and core ideas of the present invention. In addition, a person of ordinary skill in the art can make variations and modifications to the present invention in terms of the specific implementations and application scopes according to the ideas of the present invention. Therefore, the content of the specification shall not be construed as a limitation to the present invention.

What is claimed is:

1. A signal resource configuration method performed by an access network device, wherein the signal resource configuration method comprises:
   configuring a plurality of 2N-port Channel State Information Reference Signal (CSI-RS) resources to obtain a 4(2K+1)-port CSI-RS resource, wherein N and K are positive integers, wherein the 2N-port CSI-RS resources comprise a first CSI-RS resource and a second CSI-RS resource, wherein the first CSI-RS resource is a first 2N-port CSI-RS resource in a single physical resource block (PRB), and wherein the second CSI-RS resource is a second 2N-port CSI-RS resource in two different PRBs;
   obtaining a 2N-port CSI-RS resource sequence number for the second CSI-RS resource; and
   sending, to a terminal device, resource sequence numbers of the 2N-port CSI-RS resources, wherein the resource sequence numbers include the 2N-port CSI-RS resource sequence number, and wherein the 2N-port CSI-RS resource sequence number notifies the terminal device that a first N-port CSI-RS resource of the second CSI-RS resource is in a first PRB and that a second N-port CSI-RS resource of the second CSI-RS resource is in a second PRB that is adjacent to the first PRB.

2. The signal resource configuration method of claim 1, wherein the second 2N-port CSI-RS resource is either:
   a first N-port CSI-RS sub-resource in the first PRB and a second N-port CSI-RS sub-resource in the second PRB; or
   a half of a first 2N-port CSI-RS sub-resource in the first PRB and a half of a second 2N-port CSI-RS sub-resource in the second PRB.

3. The signal resource configuration method of claim 2, wherein N is equal to four and K is equal to two or three.

4. The signal resource configuration method of claim 1, wherein after configuring the 2N-port CSI-RS resources, the signal resource configuration method further comprises performing port numbering on the 4(2K+1)-port CSI-RS resource by:
   numbering a port corresponding to the first CSI-RS resource; and
   numbering a port corresponding to the second CSI-RS resource.

5. The signal resource configuration method of claim 1, wherein after configuring the 2N-port CSI-RS resources, the signal resource configuration method further comprises performing a code division multiplexing (CDM) configuration on the 4(2K+1)-port CSI-RS resource by:
configuring 2N-CDM for the first CSI-RS resource;
configuring N-CDM for the second CSI-RS resource; and
increasing transmit power by 3 decibels (dB) for the second CSI-RS resource.

6. A signal resource configuration method performed by a terminal device, wherein the signal resource configuration method comprises:
receiving, from an access network device, resource sequence numbers of a plurality of 2N-port Channel State Information Reference Signal (CSI-RS) resources, wherein the resource sequence numbers include a 2N-port CSI-RS resource sequence number, and wherein N is a positive integer;
obtaining a 4(2K+1)-port CSI-RS resource based on the resource sequence numbers of the 2N-port CSI-RS resources by configuring the 2N-port CSI-RS resources, wherein the 2N-port CSI-RS resources comprise a first CSI-RS resource and a second CSI-RS resource, wherein the first CSI-RS resource is a first 2N-port CSI-RS resource in a single physical resource block (PRB), wherein the second CSI-RS resource is a second 2N-port CSI-RS resource in two different PRBs, and wherein K is a positive integer;
determining, based on the 2N-port CSI-RS resource sequence number, that a first N-port CSI-RS resource of the second CSI-RS resource is in a first PRB and that a second N-port CSI-RS resource of the second CSI-RS resource is in a second PRB that is adjacent to the first PRB; and
receiving a reference signal from the access network device on the first N-port CSI-RS resource and the second N-port CSI-RS resource.

7. The signal resource configuration method of claim 6, wherein the second 2N-port CSI-RS resource is either:
a first N-port CSI-RS sub-resource in the first PRB and a second N-port CSI-RS sub-resource in the second PRB; or
a half of a first 2N-port CSI-RS sub-resource in the first PRB and a half of a second 2N-port CSI-RS sub-resource in the second PRB.

8. The signal resource configuration method of claim 7, wherein N is equal to four and K is equal to two or three.

9. The signal resource configuration method of claim 6, wherein after obtaining the 4(2K+1)-port CSI-RS resource, the signal resource configuration method further comprises performing port numbering on the 4(2K+1)-port CSI-RS resource by:
numbering a port corresponding to the first CSI-RS resource; and
numbering a port corresponding to the second CSI-RS resource.

10. The signal resource configuration method of claim 6, wherein after obtaining the 4(2K+1)-port CSI-RS resource, the signal resource configuration method further comprises obtaining a code division multiplexing (CDM) configuration of the 4(2K+1)-port CSI-RS resource, and wherein the CDM configuration of the 4(2K+1)-port CSI-RS resource comprises a 2N-CDM manner used for the first CSI-RS resource and an N-CDM manner used for the second CSI-RS resource.

11. An access network device, comprising:
a processor configured to:
configure a plurality of 2N-port Channel State Information Reference Signal (CSI-RS) resources to obtain a 4(2K+1)-port CSI-RS resource, wherein N and K are positive integers, wherein the 2N-port CSI-RS resources comprise a first CSI-RS resource and a second CSI-RS resource, wherein the first CSI-RS resource is a first 2N-port CSI-RS resource in a single physical resource block (PRB), and wherein the second CSI-RS resource is a second 2N-port CSI-RS resource in two different PRBs; and
obtain a 2N-port CSI-RS resource sequence number for the second CSI-RS resource; and
a transmitter coupled to the processor and configured to send, to a terminal device, resource sequence numbers of the 2N-port CSI-RS resources, wherein the resource sequence numbers include the 2N-port CSI-RS resource sequence number, and wherein the 2N-port CSI-RS resource sequence number notifies the terminal device that a first N-port CSI-RS resource of the second CSI-RS resource is in a first physical resource block (PRB) and that a second N-port CSI-RS resource of the second CSI-RS resource is in a second PRB that is adjacent to the first PRB.

12. The access network device of claim 11, wherein the second 2N-port CSI-RS resource is either:
a first N-port CSI-RS sub-resource in the first PRB and a second N-port CSI-RS sub-resource in the second PRB; or
a half of a first 2N-port CSI-RS sub-resource in the first PRB and a half of a second 2N-port CSI-RS sub-resource in the second PRB.

13. The access network device of claim 12, wherein N is equal to four and K is equal to two or three.

14. The access network device of claim 11, wherein the processor is further configured to number the 4(2K+1)-port CSI-RS resource by:
numbering a port corresponding to the first CSI-RS resource; and
numbering a port corresponding to the second CSI-RS resource.

15. The access network device of claim 11, wherein the processor is further configured to perform a code division multiplexing (CDM) configuration on the 4(2K+1)-port CSI-RS resource by:
configuring 2N-CDM for the first CSI-RS resource;
configuring N CDM for the second CSI-RS resource; and
increasing transmit power by 3 decibels (dB) for the second CSI-RS resource.

16. A terminal device, comprising:
a receiver configured to receive, from an access network device, resource sequence numbers of a plurality of 2N-port Channel State Information Reference Signal (CSI-RS) resources, wherein the resource sequence numbers include a 2N-port CSI-RS resource sequence number, and wherein N is a positive integer; and
a processor coupled to the receiver and configured to:
obtain a 4(2K+1)-port CSI-RS resource based on the resource sequence numbers of the 2N-port CSI-RS resources by configuring the 2N-port CSI-RS resources, wherein the 2N-port CSI-RS resources comprise a first CSI-RS resource and a second CSI-RS resource, wherein the first CSI-RS resource is a first 2N-port CSI-RS resource in a single physical resource block (PRB), wherein the second CSI-RS resource is a second 2N-port CSI-RS resource in two different PRBs, and wherein K is a positive integer; and
determine, based on the 2N-port CSI-RS resource sequence number, that a first N-port CSI-RS resource of the second CSI-RS resource is in a first PRB and that a second N-port CSI-RS resource of the second CSI-RS resource is in a second PRB that is adjacent to the first PRB,
wherein the receiver is further configured to receive a reference signal from the access network device on the first N-port CSI-RS resource and the second N-port CSI-RS resource.

17. The terminal device of claim 16, wherein the second 2N-port CSI-RS resource is either:
a first N-port CSI-RS sub-resource in the first PRB and a second N-port CSI-RS sub-resource in the second PRB; or
a half of a first 2N-port CSI-RS sub-resource in the first PRB and a half of a second 2N-port CSI-RS sub-resource in the second PRB.

18. The terminal device of claim 17, wherein N is equal to four and K is equal to two or three.

19. The terminal device of claim 16, wherein the processor is further configured to perform port numbering on the 4(2K+1)-port CSI-RS resource by:
numbering a port corresponding to the first CSI-RS resource; and
numbering a port corresponding to the second CSI-RS resource.

20. The terminal device of claim 16, wherein the processor is further configured to obtain a code division multiplexing (CDM) configuration of the 4(2K+1)-port CSI-RS resource, and wherein the CDM configuration of the 4(2K+1)-port CSI-RS resource comprises a 2N-CDM manner used for the first CSI-RS resource and an N-CDM manner used for the second CSI-RS resource.

* * * * *